(12) United States Patent
Kobayashi

(10) Patent No.: US 12,483,812 B2
(45) Date of Patent: Nov. 25, 2025

(54) SEMICONDUCTOR DEVICE

(71) Applicant: Canon Kabushiki Kaisha, Tokyo (JP)

(72) Inventor: Daisuke Kobayashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 17/959,477

(22) Filed: Oct. 4, 2022

(65) Prior Publication Data
US 2023/0113504 A1 Apr. 13, 2023

(30) Foreign Application Priority Data

Oct. 12, 2021 (JP) .................. 2021-167252

(51) Int. Cl.
H04N 25/79 (2023.01)
G06T 7/55 (2017.01)
H04N 25/60 (2023.01)
H04N 25/709 (2023.01)
H04N 25/71 (2023.01)
H04N 25/78 (2023.01)
H10F 39/00 (2025.01)

(52) U.S. Cl.
CPC ............ *H04N 25/79* (2023.01); *G06T 7/55* (2017.01); *H04N 25/709* (2023.01); *H04N 25/745* (2023.01); *H04N 25/78* (2023.01); *H10F 39/809* (2025.01); *G06T 2207/30252* (2013.01); *H04N 25/60* (2023.01)

(58) Field of Classification Search
CPC .... H04N 25/79; H04N 25/709; H04N 25/745; H04N 25/78; H04N 25/60; G06T 7/55; G06T 2207/30252; H10F 39/809
See application file for complete search history.

(56) References Cited

U.S. PATENT DOCUMENTS

| 6,809,393 B1* | 10/2004 | Yamazaki ............ H10D 84/811 |
| | | 257/493 |
| 8,742,310 B2 | 6/2014 | Guezzi et al. |
| 10,820,888 B2* | 11/2020 | Boser .................. A61B 8/4483 |
| 11,152,418 B2 | 10/2021 | Kameshima et al. |
| 11,153,515 B2 | 10/2021 | Sukegawa et al. |
| 11,418,743 B2 | 8/2022 | Kuroda |
| 2013/0119233 A1 | 5/2013 | Guezzi et al. |
| 2016/0247845 A1* | 8/2016 | Yamashita ............ H10F 39/014 |

(Continued)

FOREIGN PATENT DOCUMENTS

JP 2012151847 A 8/2012
JP 2014165396 A 9/2014

(Continued)

OTHER PUBLICATIONS

Japanese Office Action dated Jul. 22, 2025 in counterpart Japanese Patent Appln. No. 2021-167252.

*Primary Examiner* — Chiawei Chen
(74) *Attorney, Agent, or Firm* — Venable LLP

(57) ABSTRACT

A semiconductor device includes a first substrate provided with a first circuit unit, and a second substrate provided with a second circuit unit connected to the first circuit unit and a third circuit unit connected to the second circuit unit. The second circuit unit is configured to supply a driving voltage to the first circuit unit, and at least a part of driving voltages of the second circuit unit is configured to be supplied from the first substrate to the second circuit unit.

21 Claims, 21 Drawing Sheets

(56) References Cited

U.S. PATENT DOCUMENTS

| | | | |
|---|---|---|---|
| 2016/0309101 A1* | 10/2016 | Itano | H10F 39/809 |
| 2018/0109741 A1 | 4/2018 | Sukegawa et al. | |
| 2018/0240797 A1* | 8/2018 | Yokoyama | H10D 84/0149 |
| 2019/0253654 A1* | 8/2019 | Kuroda | H10F 39/12 |
| 2020/0137343 A1* | 4/2020 | Kamashita | H10F 39/018 |
| 2020/0213541 A1* | 7/2020 | Kobayashi | H10F 39/811 |
| 2021/0013253 A1* | 1/2021 | Takase | H10F 39/809 |
| 2021/0104572 A1* | 4/2021 | Kameshima | H10F 39/12 |
| 2021/0168322 A1* | 6/2021 | Kobayashi | H10F 39/8033 |
| 2022/0157877 A1* | 5/2022 | Shohji | H01L 25/16 |
| 2023/0047180 A1* | 2/2023 | Kodama | H04N 25/79 |
| 2023/0126104 A1* | 4/2023 | Nakanishi | H04N 25/771 |
| | | | 348/308 |

FOREIGN PATENT DOCUMENTS

| | | | |
|---|---|---|---|
| JP | 2017117828 A | 6/2017 | |
| JP | 2019140253 A | 8/2019 | |
| JP | 2019140524 A | 8/2019 | |
| JP | 2021125491 A | 8/2021 | |
| WO | 2016170833 A1 | 10/2016 | |
| WO | 2018186197 A1 | 10/2018 | |

* cited by examiner

SEMICONDUCTOR DEVICE

BACKGROUND OF THE INVENTION

Field of the Invention

The present invention relates to a semiconductor device.

Description of the Related Art

As semiconductor devices, logic devices such as CPU (Central Processing Unit) and GPU (Graphics Processing Unit), and memory devices such as DRAM (Dynamic Random Access Memory) and NVM (Non-Volatile Memory) are known. Further, as a semiconductor device, a photoelectric conversion device such as a CCD (Charge Coupled Device) sensor or a CMOS (Complementary Metal-Oxide-Semiconductor) sensor used in a digital still camera or a camcorder is known.

These semiconductor devices are required to be further miniaturized and functionalized in order to realize higher performance and higher added value. For example, in a photoelectric conversion device, miniaturization of pixels is required in order to obtain a high-definition image. However, as the pixel becomes finer, the light receiving area of the photoelectric conversion element included in the pixel becomes smaller, and the sensitivity decreases. In addition, when control of pixels and processing of pixel signals are complicated for higher functionality, circuits and signal lines for realizing them are increased, and the light receiving area of the photoelectric conversion element is further reduced.

Japanese Patent Application Laid-Open No. 2012-151847 discloses a CMOS image sensor formed by stacking two substrates. In this image sensor, a pixel and a readout circuit are disposed on a first substrate, and a control circuit for controlling the pixel, the readout circuit, and the like is disposed on a second substrate. By configuring the image sensor in this manner, the number of circuits of the first substrate can be reduced, and the compression of the area of the photoelectric conversion element can be reduced. Further, since the pixel can be controlled for each predetermined block, the photoelectric conversion device can have higher functionality.

In a semiconductor device in which a plurality of substrates is stacked, functional blocks such as a pixel, a readout circuit, and a control circuit are distributed to each substrate, and power is supplied or various signals are input/output between the substrates. However, in such a structure, crosstalk may occur between one substrate and another substrate. For example, a power supply variation in one of the substrates affects a circuit of the other substrate, which may cause a pixel signal to be superimposed on the circuit as noise, causing deterioration of image quality or deterioration of operation accuracy of the circuit.

SUMMARY OF THE INVENTION

An object of the present invention is to provide a technology for suppressing noise contamination due to crosstalk between substrates and deterioration of operation accuracy in a semiconductor device formed by stacking a plurality of substrates.

According to an embodiment of the present specification, there is provided a semiconductor device including a first substrate provided with a first circuit unit, and a second substrate provided with a second circuit unit connected to the first circuit unit and a third circuit unit connected to the second circuit unit, wherein the second circuit unit supplies a driving voltage to the first circuit unit, and wherein at least a part of driving voltages of the second circuit unit is supplied from the first substrate to the second circuit unit.

According to another embodiment of the present specification, there is provided a semiconductor device including a first substrate on which a pixel configured to output a pixel signal based on a charge generated in a photoelectric conversion element and an amplifier configured to amplify the pixel signal are disposed, and a second substrate on which a first operation unit configured to generate a control signal for controlling a gain of the amplifier and a first driving unit configured to shift a level of the control signal to a level in accordance with a driving voltage of the amplifier to drive the amplifier are disposed, wherein the control signal is input from the first driving unit to the amplifier via a connecting portion between the first substrate and the second substrate, and wherein at least one of a power supply voltage and a reference voltage for driving the first driving unit is supplied from the first substrate to the first driving unit via a connecting portion between the first substrate and the second substrate.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the following embodiments, an imaging device will be mainly described as an example of a semiconductor device. However, the semiconductor device to which the configuration of each embodiment may be applied is not limited to the imaging device, and may be applied to other examples of the semiconductor device. Examples of the semiconductor device to which the present invention may be applied include a logic device typified by a CPU and a GPU, a memory device typified by a DRAM and an NVM, and a photoelectric conversion device. Examples of the photoelectric conversion device include an imaging device described below, a distance measuring device (device such as distance measurement using focus detection and TOF (Time Of Flight)), and a photometric device (device such as measuring the amount of incident light).

First Embodiment

Figure 1:
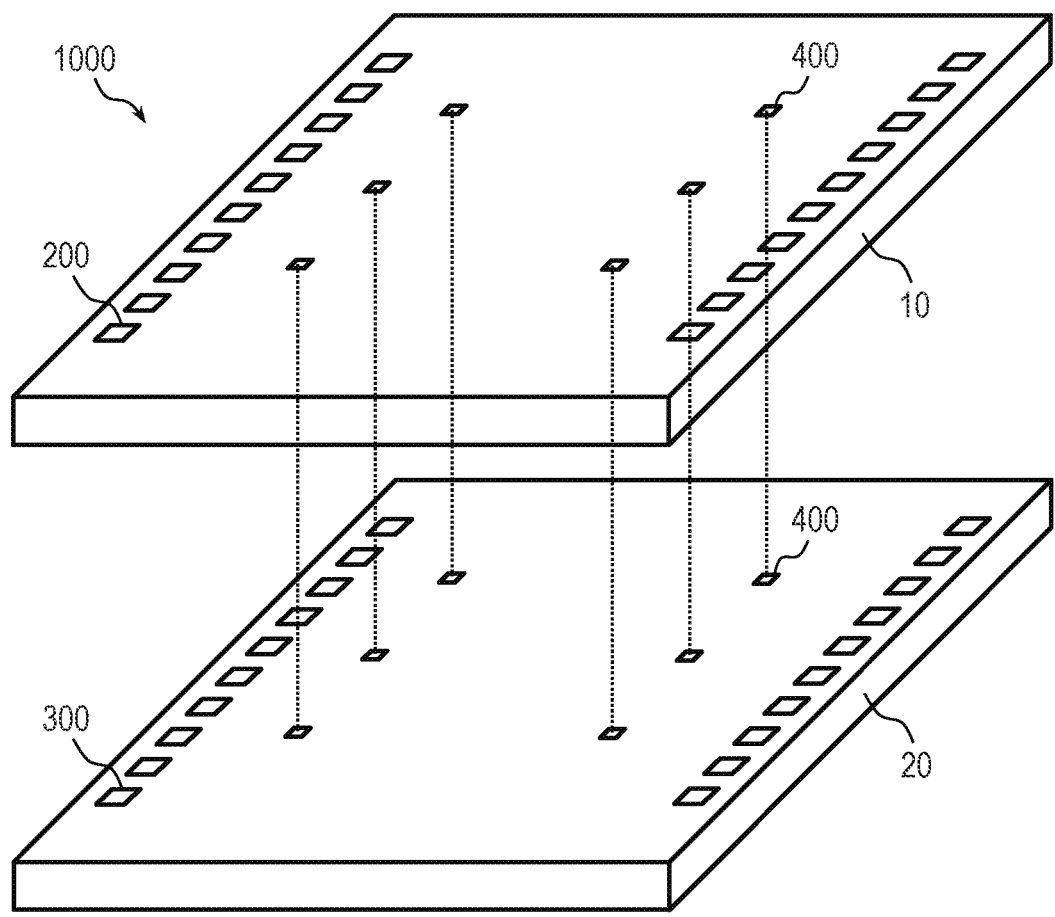
FIG. 1 is a perspective view illustrating the general configuration of an imaging device according to a first embodiment of the present invention.

A general configuration of an imaging device according to a first embodiment of the present invention will be described with reference to FIG. 1. FIG. 1 is a perspective view illustrating a schematic configuration of an imaging device according to the present embodiment.

As illustrated in FIG. 1, the imaging device 1000 according to the present embodiment includes a first substrate 10 and a second substrate 20. Although FIG. 1 illustrates the first substrate 10 and the second substrate 20 separately for easy understanding, actually, the first substrate 10 and the second substrate 20 are stacked and bonded to each other to form one imaging device 1000.

The method of bonding the first substrate 10 and the second substrate 20 to each other is not particularly limited, but here, the first substrate 10 and the second substrate 20 are bonded to each other by metal bonding between metal members disposed in the insulating layer of the first substrate 10 and metal members disposed in the insulating layer of the second substrate 20. FIG. 1 illustrates the metal bonding portion as connecting portions 400. Otherwise, the first substrate 10 and the second substrate 20 may be electrically and physically bonded to each other using bump electrodes.

A plurality of pad electrodes 300 are disposed on a surface of the second substrate 20. The first substrate 10 is provided with a plurality of openings 200 corresponding to the positions of the plurality of pad electrodes 300. The openings 200 are formed so as to penetrate the first substrate 10, and when the first substrate 10 and the second substrate 20 are bonded to each other, the pad electrodes 300 are exposed in the openings 200. By connecting bonding wires (not illustrated) to the pad electrodes 300 exposed in the openings 200, electrical connection is made between the imaging device and an external device.

Figure 2:
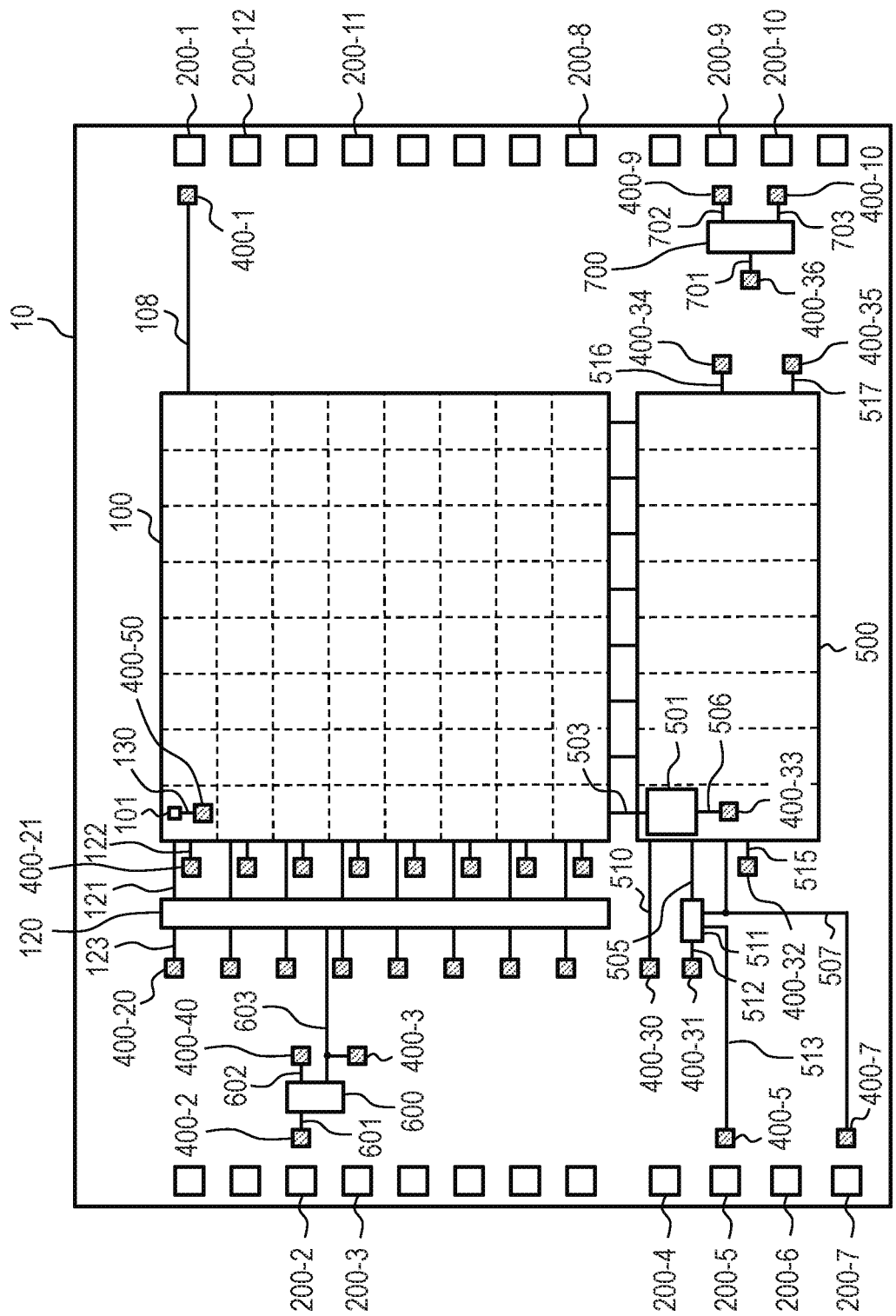
FIG. 2 and FIG. 3 are schematic plan views illustrating a schematic configuration of an imaging device according to a reference example.
Figure 3:
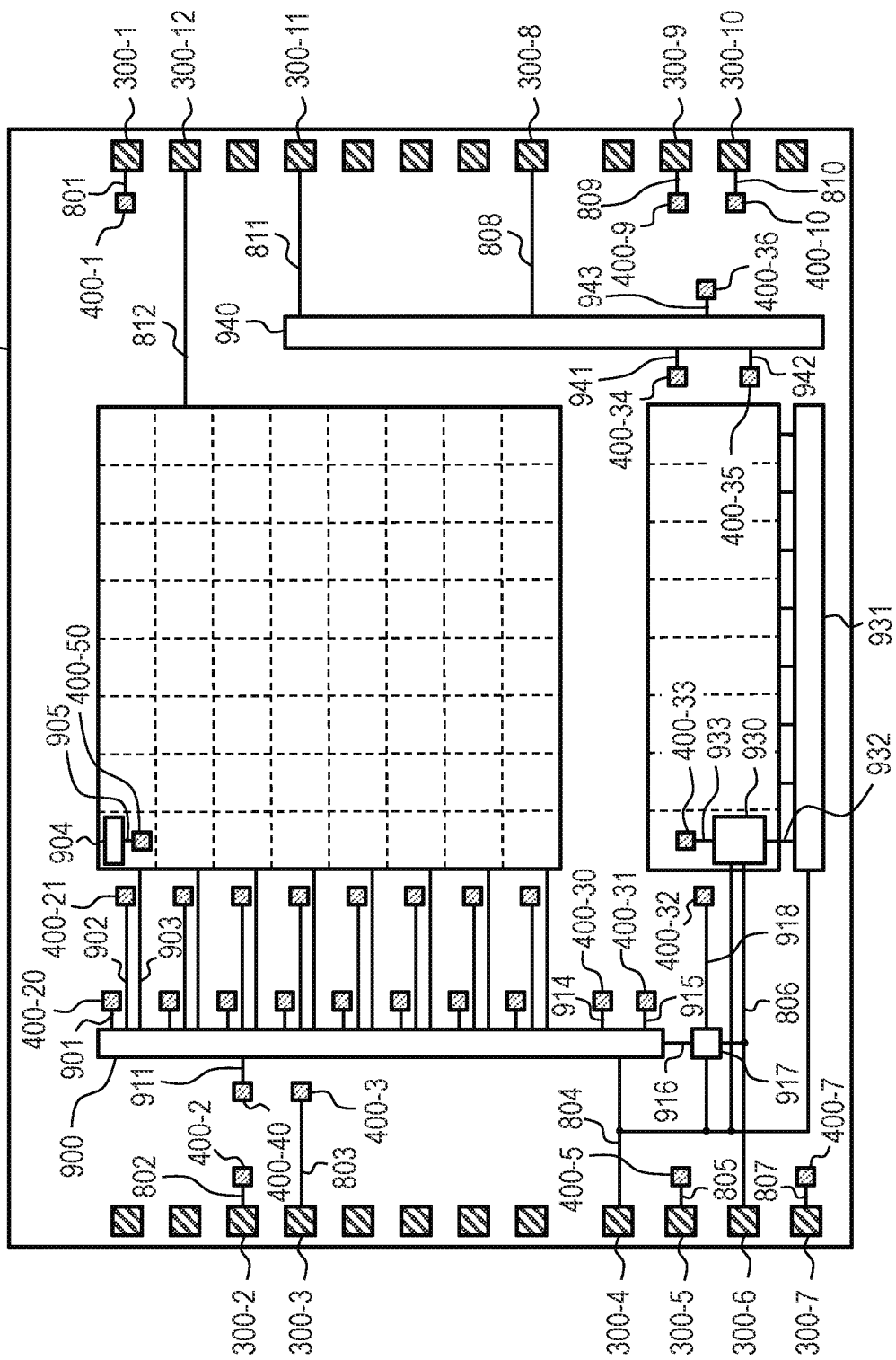
Figure 4:
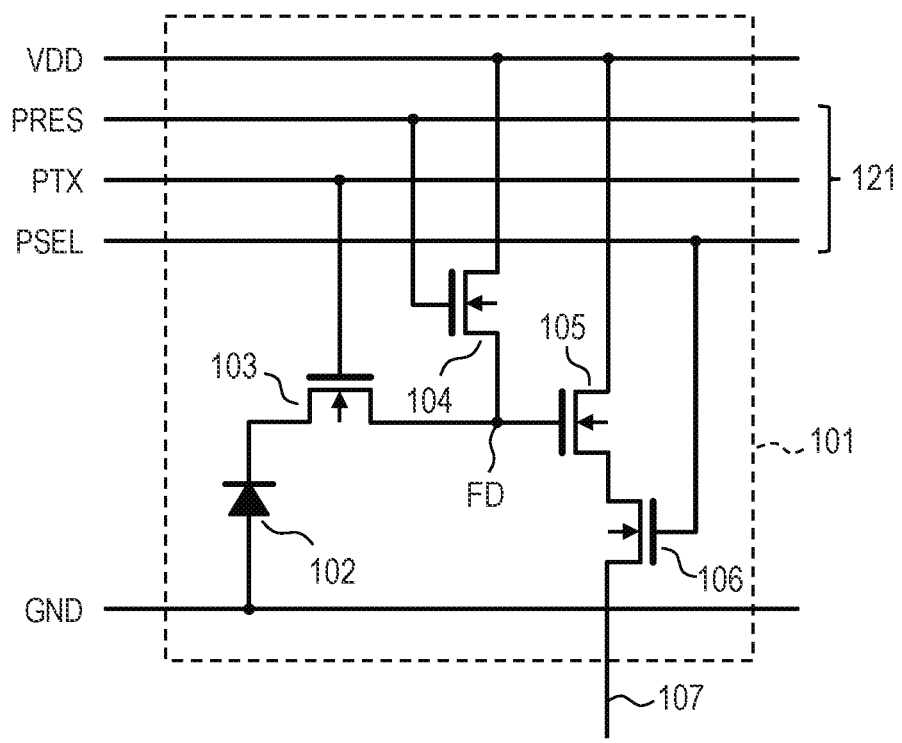
FIG. 4 is an equivalent circuit diagram illustrating a configuration example of a pixel in the imaging device.
Figure 5:
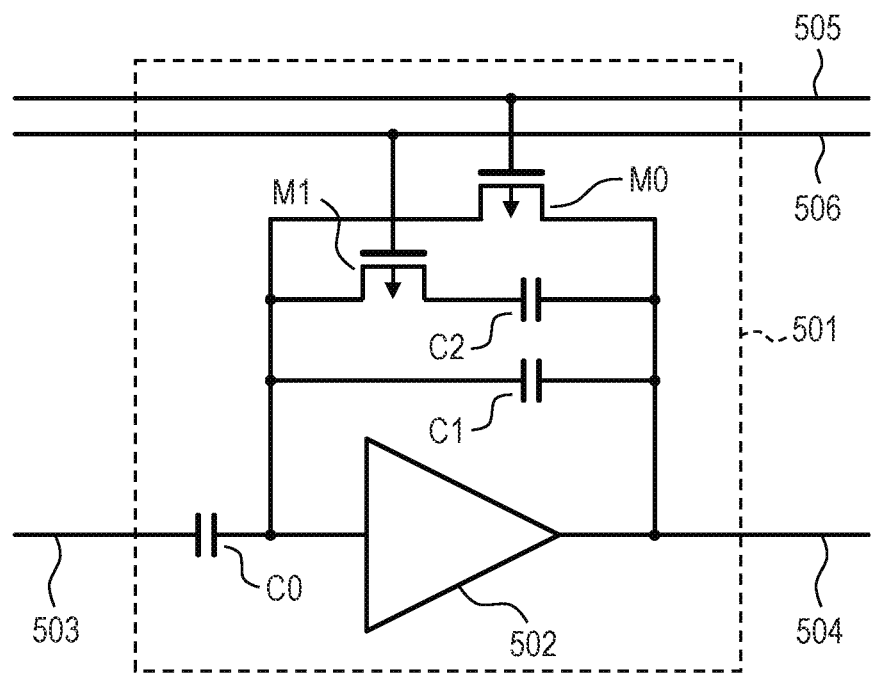
FIG. 5 is an equivalent circuit diagram illustrating a configuration example of an amplifier in the imaging device.
Figure 6:
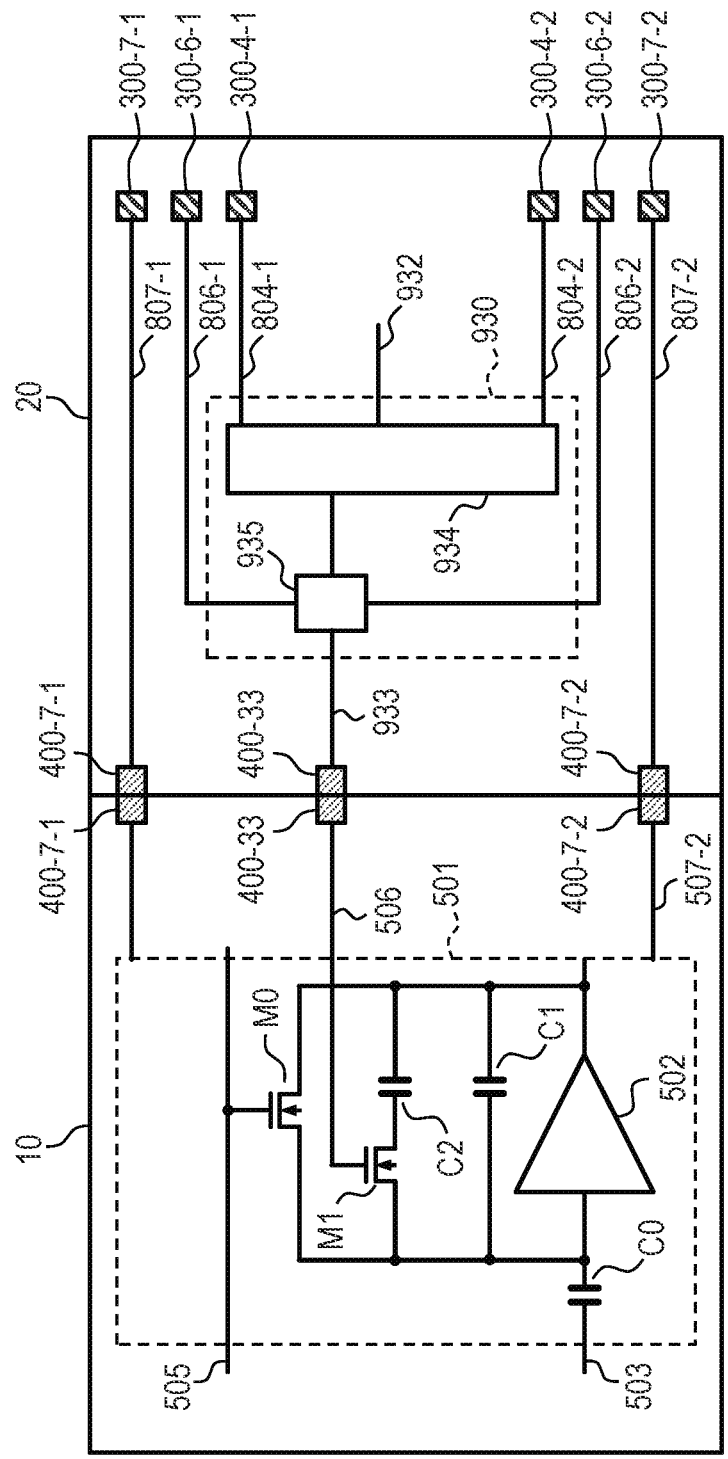
FIG. 6 is a schematic diagram illustrating a configuration example of a connecting portion in the imaging device according to the reference example.

Before describing the imaging device according to the present embodiment, a schematic configuration of an imaging device according to a reference example of the present embodiment will be described with reference to FIG. 2 to FIG. 6. FIG. 2 and FIG. 3 are schematic plan views illustrating a schematic configuration of the imaging device according t the reference example. FIG. 4 is an equivalent circuit diagram illustrating a configuration example of a pixel. FIG. 5 is an equivalent circuit diagram illustrating a configuration example of an amplifier. FIG. 6 is a circuit diagram illustrating a connection relationship between an amplifier and a signal processing control unit in the imaging device according to the reference example.

FIG. 2 illustrates a planar layout of the first substrate 10. FIG. 3 illustrates a planar layout of the second substrate 20. In this reference example, it is assumed that a pixel unit and an analog circuit mainly for processing pixel signals are disposed on the first substrate 10, and a circuit relating to timing generation for driving a circuit mainly disposed on the first substrate 10 and a circuit mainly for processing digital signals are disposed on the second substrate 20. Further, each of the circuits arranged on the first substrate 10 and the second substrate 20 is configured such that an appropriate power supply is connected to each of the circuits in accordance with, for example, classification such as an analog circuit or a digital circuit, operation voltage of each circuit, and the like.

The arrangement of these functional blocks is not limited to the example described in this reference example. For example, the first substrate 10 may have a configuration in which only the pixel unit 100 is provided, or a configuration in which a part of a circuit relating to timing generation or a circuit for processing digital signals is provided on the first substrate 10.

As described above, a plurality of pad electrodes 300 are disposed on the second substrate 20, and electrical connection with an external device is made via bonding wires. Therefore, the openings 200 for connecting the wires to the pad electrodes 300 by wire bonding are formed in the first substrate 10 in accordance with the position of the pad electrodes 300 of the second substrate 20. FIG. 2 illustrates a plurality of openings 200 provided in the first substrate 10 in order to illustrate the relationship with the positions of the pad electrodes 30) disposed on the second substrate 20. The openings 200-1 to 200-12 illustrated in FIG. 2 are openings corresponding to the pad electrodes 300-1 to 300-12 provided on the second substrate 20. The same applies to the openings 200-13 to 200-17 and the pad electrodes 300-13 to 300-17 described in the following embodiments.

The first substrate 10 and the second substrate 20 are electrically connected to each other a plurality of connecting portions 400. Each of the plurality of connecting portions 400 is disposed at the same coordinates on the planar layout in the first substrate 10 and the second substrate 20. In the following description, for each of the plurality of connecting portions 400, the connecting portions 400 arranged on the first substrate 10 and the connecting portions 400 arranged on the second substrate 20 are denoted by the same reference numerals. Further, each of the plurality of connecting portions 400 is distinguished by a branch number attached to the reference numeral 400. For example, the connecting portion 400-1 is the connecting portion 400 disposed at the same coordinates on the planar layout in the first substrate 10 and the second substrate 20, and is disposed at a different coordinate from the connecting portion 400-2. When a common description is given to a plurality of connecting portions 400, reference numerals omitting the branch numbers are used. For example, a connecting portion 400 indicates a plurality of connecting portions 400-n (n is a natural number).

In the drawings of the present application, the interconnection or the connecting portion 400 is represented by a single element, but in practice, one interconnection or the connecting portion 400 on the drawings may be constituted by a plurality of interconnections or a plurality of connecting portions 400, such as a plurality of power supply lines, a plurality of ground lines, and a plurality of control lines. Even when the same power supply or signal is supplied, a plurality of connecting portions 400 may be provided in order to reduce resistance or redundancy of the connecting portions 400. In the following description, even when a plurality of interconnections or connecting portions are provided, the description may be omitted for simplification of the drawings and description.

In FIG. 2 and FIG. 3, the components, the interconnections, and the connecting portions 400 are illustrated in a physically overlapping arrangement in a plan view; however, some of these components may overlap in a plan view. For example, the connecting portion 400 may be disposed at a position overlapping with other components in a plan view.

Between the first substrate 10 and the second substrate 20, drive signals for controlling the pixels 101 and a circuit for processing the pixel signals, the pixel signals on which the signal processing is performed, and the like are transmitted via a plurality of connecting portions 400. First, the components arranged on the first substrate 10 will be described, and next, the components arranged on the second substrate 20, signal transmission between the substrates, control, and driving in the configuration in which the substrates are bonded to each other will be described.

First, the configuration of the first substrate 10 will be described with reference to FIG. 2, FIG. 4, and FIG. 5. For example, as illustrated in FIG. 2, the first substrate 10 may include a pixel unit 100, a pixel control unit 120, a signal processing unit 500, a reference voltage generation unit 600, and an output unit 70) in addition to a plurality of openings 200 and a plurality of connecting portions 400.

The pixel unit 100 includes a plurality of pixels 101 arranged in a matrix over a plurality of rows and a plurality of columns. Each of the plurality of pixels 101 includes a photoelectric conversion element such as a photodiode, converts an optical signal into an electric signal, and outputs the electric signal. In this reference example, a plurality of pixel blocks each including a plurality of pixels 101 are provided in the pixel unit 100, and driving of the pixels 101 can be controlled in units of these pixel blocks. Here, as illustrated by a dotted line in FIG. 2, it is assumed that the pixel unit 100 is divided into a total of 64 pixel blocks of 8 rows×8 columns. Note that the number of pixel blocks included in the pixel unit 100, the method of dividing the pixel blocks, the number of pixels 101 included in each pixel block, and the like may be changed as appropriate. Since a plurality of pixels 101 arranged two-dimensionally may be controlled in units of pixel blocks, optimal control may be performed for each pixel block according to the luminance of an object.

Each of the plurality of pixels 101 may include, for example, as illustrated in FIG. 4, a photoelectric conversion element 102, a transfer transistor 103, a reset transistor 104, an amplifier transistor 105, and a select transistor 106.

The photoelectric conversion element 102 is, for example, a photodiode, and has an anode connected to a reference voltage line (reference voltage GND) and a cathode connected to a source of the transfer transistor 103. A drain of the transfer transistor 103 is connected to a source of the reset transistor 104 and a gate of the amplifier transistor 105. A node to which the drain of the transfer transistor 103, the source of the reset transistor 104, and the gate of the amplifier transistor 105 are connected is a so-called floating diffusion FD. The floating diffusion FD includes a capacitance component (floating diffusion capacitance) and functions as a charge holding portion. The floating diffusion capacitance may include a p-n junction capacitance and an interconnection capacitance. A drain of the reset transistor 104 and a drain of the amplifier transistor 105 are connected to a power supply voltage line (power supply voltage VDD). A source of the amplifier transistor 105 is connected to a drain of the select transistor 106. A source of the select transistor 106 is connected to an output line 107.

The pixel 101 is controlled by a control signal supplied from a pixel control unit 120 via a pixel control line 121 provided in each row. In the case of the pixel configuration of FIG. 4, the pixel control line 121 includes a signal line connected to a gate of the transfer transistor 103, a signal line connected to a gate of the reset transistor 104, and a signal line connected to a gate of the select transistor 106. A control signal PTX is supplied from the pixel control unit 120 to the gate of the transfer transistor 103 via the signal line. A control signal PRES is supplied from the pixel control unit 120 to the gate of the reset transistor 104 via the signal line. A control signal PSEL is supplied from the pixel control unit 120 to the gate of the select transistor 106 via the signal line. When each transistor is formed of an n-channel MOS transistor, when a high-level control signal is supplied from the pixel control unit 120, the corresponding transistor is turned on. When a low-level control signal is supplied from the pixel control unit 120, the corresponding transistor is turned off.

The output line 107 is a signal line provided in each column of the pixel unit 100. Each of the output lines 107 is connected to a plurality of pixels 101 arranged in a corresponding column. The power supply line to which the power supply voltage VDD is supplied and the reference voltage line to which the reference voltage GND is supplied are included in a power supply line 108. In FIG. 2, in order to simplify the drawing, the power supply line 108 is illustrated by one signal line. The same applies to other power supply lines. When the power supply voltage line and the reference voltage line are distinguished from each other, a prescribed branch number is attached to the reference numeral of the power supply line 108, such as 108-1 for the power supply voltage line and 108-2 for the ground voltage line.

The pixel control unit 120 is a control circuit that supplies control signals for controlling the pixels 101 to the pixel unit 100 via the pixel control lines 121. In FIG. 2, the pixel control line 121 is illustrated as one signal line for simplification of the drawing, but the pixel control line 121 includes a plurality of signal lines including signal lines for supplying the control signals PTX, PRES, and PSEL. Although reference numerals are omitted in FIG. 2, the pixel control lines 121 are arranged for each of the 8-row×8-column pixel blocks. Note that the control signals supplied via the pixel control lines 121 may be for any one of control for each pixel, control for each row of pixels, and control for each pixel block.

The pixel signals output from the pixel unit 100 are input to the signal processing unit 500 via interconnections 503. The signal processing unit 500 includes a processing circuit for performing predetermined signal processing on the pixel signals output from the pixel unit 100. The signal processing unit 500 includes a plurality of processing circuits corresponding to each column of the pixel block of the pixel unit 100, and is configured to be able to be controlled in units of blocks.

The signal processing unit 500 may comprise a constant current circuit. The amplifier transistor 105 of the pixel 101 is configured to be supplied with a bias current from the constant current circuit via the interconnection 503, the output line 107, and the select transistor 106, and constitutes a source follower circuit. By configuring the source follower circuit in this manner, a pixel signal corresponding to the amount of charge generated in the photoelectric conversion element 102 is output from the pixel unit 100. The output signal from the source follower circuit may be amplified by an amplifier 501 included in each of the plurality of processing circuits of the signal processing unit 500.

For example, as illustrated in FIG. 5, the amplifier 501 may include an amplifier circuit 502, an input capacitor C0, feedback capacitors C1 and C2, and switches M0 and M1. An input node of the amplifier circuit 502 is connected to the interconnection 503 via the input capacitor C0. An output node of the amplifier circuit 502 is connected to an amplified signal output line 504. The switch M0, the feedback capacitor C1, and a series connection body of the feedback capacitor C2 and the switch M1 are connected in parallel between the input node and the output node of the amplifier circuit 502. The switch M0 is controlled by a control signal supplied via a reset control line 505. The switch M1 is controlled by a control signal supplied via a gain control line 506. When the amplifier circuit 502 is an inverting amplifier circuit, the voltage amplification factor of the amplifier 501 is expressed as –(capacitance of the input capacitor (C0))/(capacitance of the feedback capacitor(s) (C1, C2)). In a system in which negative feedback is applied to the amplifier circuit 502, by selecting one of the feedback capacitors C1 and (C1+C2) by the switch M1, the voltage amplification factor determined by the voltage division ratio between the feedback capacitors C1 and C2 and the input capacitor C0 can be switched.

The switch M0 is a switch for short-circuiting the input node and the output node of the amplifier circuit 502, and resets the amplifier 501 by turning on. The amplifier 501 is reset before the readout operation and the amplification operation of the pixel signal. After the reset of the amplifier 501 is released, the pixel signal output from the source follower circuit is amplified at a predetermined voltage amplification factor set in the amplifier 501 and output from the amplified signal output line 504. That is, when the switch M1 is an off-state, the pixel signal is amplified by the voltage amplification factor of –C0/C1, and output from the amplified signal output line 504. When the switch M1 is an on-state, the pixel signal is amplified by a voltage amplification factor of –C0/(C1+C2), and output from the amplified signal output line 504. In this reference example, one kind of input capacitor (C0) and two kinds of feedback capacitors (C1, C2) are used, but the number of input capacitors and/or feedback capacitors may be further increased to set more kinds of voltage amplification factors.

The signal processing unit 500 may include a plurality of signal processing functions including an amplification function by an amplifier 501. For example, the signal processing unit 500 may further include a function of performing analog/digital conversion (A/D conversion) on the pixel signal amplified by the amplifier 501. The signal processing unit 500 may further include a digital memory for holding the A/D conversion result, and a scanning circuit for sequentially reading out the digital data held in the digital memory. Other functions that the signal processing unit 500 may have include, for example, a function of performing correction processing using CDS (Correlated Double Sampling), a function of sampling and holding (S/H) pixel signals, and the like. A power supply voltage and a reference voltage GND are supplied to the signal processing unit 500 via a power supply line 507. In FIG. 2, components other than the amplifier 501 are omitted for simplification of the drawing.

The signal processing unit 500 is controlled by control signals input via control lines 510, 515, and 516, and a control signal generated by a signal processing control unit 511 and input via a reset control line 505. Here, the signal processing control unit 511 has a function of generating a reset control signal for controlling the reset operation of the amplifier 501. The signal processing control unit 511 generates a reset control signal based on a control signal input from a drive timing control unit 900 disposed on the second substrate 20, which will be described later, via a control line 512.

Here, the operation voltages of some of the circuits included in the signal processing unit 500 may be different from the operation voltages of the drive timing control unit 900. For example, the drive timing control unit 900 is classified into digital circuits, and operates at a low voltage (referred to as a voltage V1) in order to reduce power consumption because the signal amplitude to be handled is small. On the other hand, some of the circuits included in the signal processing unit 500 operate at a voltage (referred to as a voltage V2) higher than the voltage V1 because the signal amplitude to be processed is large and a wide input/output range is required. In this reference example, since the amplifier 501 that amplifies the pixel signal requires a wide output range, the operation voltage of the amplifier 501 is set to the voltage V2. A power supply voltage of the same voltage V1 as the drive timing control unit 900 and a reference voltage are supplied to the signal processing control unit 511 via a power supply line 513, and a power supply voltage of the same voltage V2 as the signal processing unit 500 and a reference voltage are supplied to the signal processing control unit 511 via a power supply line 507. The signal processing control unit 511 converts a control signal having a signal amplitude corresponding to the voltage V1 input from the drive timing control unit 900 into a control signal having a signal amplitude corresponding to the voltage V2 which is a drive voltage of the amplifier 501, and generates a reset control signal for driving the amplifier 501.

The reference voltage generation unit 600 generates a reference voltage for driving the pixel unit 100. A power supply voltage and a reference voltage GND are supplied to the reference voltage generation unit 600 via a power supply line 601. In addition, a control signal for controlling setting of a generating voltage or the like is input to the reference voltage generation unit 600 via a control line 602. The reference voltage generation unit 600 outputs the generated voltage via an output line 603.

The output unit 700 has a function of processing a digital signal based on the pixel signal processed by the signal processing unit 500 and outputting the processed digital signal to the outside of the imaging device. Digital data processed by the signal processing unit 500 is input to the output unit 700 via a signal input line 701. A power supply voltage and a reference voltage GND are supplied to the output unit 700 via a power supply line 702. The data processed by the output unit 700 is output to the outside of the imaging device via an output line 703, a connecting portion 400-10, an interconnection 810, and a pad electrode 300-10. The data output method may be, for example, a method of outputting a voltage from a single terminal such as a buffer circuit, or a LVDS (Low Voltage Differential Signaling) method having two differential terminals. When the digital signal input to the output unit 700 is parallel data, the output unit 700 may include a parallel-serial conversion unit (P/S conversion unit).

Next, a configuration of the second substrate 20, and a signal transmission relationship and a control relationship between the second substrate 20 and the first substrate 10 via the connecting portions 400 will be described with reference to FIG. 3. As illustrated in FIG. 3, in addition to the plurality of pad electrodes 300 and the plurality of connecting portions 400, a drive timing control unit 900, a pixel control unit 904, and a signal processing control unit 917 may be provided on the second substrate 20. The second substrate 20 may further include a signal processing control unit 930, a signal processing drive control unit 931, and a digital signal processing unit 940.

The power supply voltage and the reference voltage GND supplied to the pixel unit 100 are supplied to a pad electrode 300-1 from the outside of the imaging device. In FIG. 3, in order to simplify the drawing, as in the case of the power supply line, a power supply pad to which the power supply voltage and the reference voltage GND are supplied is represented by one pad electrode 300-1. The pad electrode 300-1 is electrically connected to the pixel unit 100 via a power supply line 801, a connecting portion 400-1, and the power supply line 108.

The drive timing control unit 900 is a control circuit that controls the entire imaging device. The power supply voltage of the voltage V1 and the reference voltage GND are supplied from a pad electrode 300-4 to the drive timing control unit 900 via a power supply line 804. Control lines 901, 902, 903, 914, 915 and 916 are connected to the drive timing control unit 900.

The control lines 901, 902, and 903 are interconnections for transmitting control signals related to control of the pixel unit 100. The control lines 901 are connected to the pixel control unit 120 via connecting portions 400-20 and interconnections 123. The control lines 902 are connected to the pixel unit 100 via the connecting portions 400-21 and the pixel control lines 122.

In this reference example, a plurality of pixels 101 arranged in the pixel unit 100 are controlled in units of pixel blocks. As an operation of controlling the pixel unit 100 in units of pixel blocks, for example, there is control of the accumulation time of the pixels 101. In this reference example, a connecting portion 400-50 is provided in the pixel unit 100, and the accumulation time of each pixel block can be controlled via the connecting portion 400-50. A pixel control unit 904 and a connecting portion 400-50 are disposed at positions corresponding to the respective pixel blocks. The pixel control unit 904 is connected to the pixel 101 via an interconnection 905, the connecting portion 400-50, and an interconnection 130. A control signal is supplied from the drive timing control unit 900 to the pixel control unit 904 via the control line 903. The pixel control unit 904 generates an accumulation time control signal for controlling the accumulation time of the pixels 101 belonging to the pixel block in response to a control signal from the drive timing control unit 900. The accumulation time control signal generate d by the pixel control unit 904 is supplied to the pixel 101 via the interconnection 905, the connecting portion 400-50, and the interconnection 130.

Although FIG. 2 and FIG. 3 illustrate the pixel control unit 904 and the connecting portion 400-50 in only one pixel block for simplification of the drawing, the pixel control unit 904 and the connecting portion 400-50 are arranged in all the pixel blocks. The accumulation time in the pixel unit 100 may be controlled not only by the pixel control unit 904 but also by the drive timing control unit 900 or the pixel control unit 120. Similarly, other operations relating to the pixel 101 may be controlled by any one of the drive timing control unit 900, the pixel control unit 120, and the pixel control unit 904.

The control lines 914, 915, and 916 are interconnections for transmitting control signals relating to control of the signal processing unit 500. The control line 914 is connected to the signal processing unit 500 via a connecting portion 400-30 and the control line 510. The control line 915 is connected to the signal processing control unit 511 via a connecting portion 400-31 and the control line 512. The control line 916 is connected to the signal processing control unit 917. The signal processing control unit 917 has the same function as the signal processing control unit 511 disposed on the first substrate 10. The power supply voltage of the voltage V1 and the reference voltage GND are supplied from a pad electrode 300-4 via a power supply line 804 to the signal processing control unit 917, and the power supply voltage of the voltage V2 and the reference voltage GND are supplied from a pad electrode 300-6 via a power supply line 806. The signal processing control unit 917 is connected to the signal processing unit 500 via a control line 918, a connecting portion 400-32, and the control line 515. The control signal generated by the signal processing control unit 917 is input to the signal processing unit 500 via the control line 918, the connecting portion 400-32, and the control line 515.

In this reference example, as described above, the pixel 101 is controlled in units of pixel blocks including the plurality of pixels 101. Further, in this reference example, the driving of the signal processing unit 500 may be controlled for each block according to the unit of the pixel block. In FIG. 3, the units of blocks constituting the signal processing unit 500 are indicated by dotted lines as in the pixel unit 100. A signal processing control unit 930 and a connecting portion 400-33 are disposed at positions corresponding to each block of the signal processing unit 500. Operations of controlling the signal processing unit 500 in units of blocks include, for example, the control of the voltage amplification factor of the amplifier 501. Other controls include control of the drive current of the amplifier circuit 502, control of power-on or power-down, and the like.

The signal processing drive control unit 931 has a function of controlling the voltage amplification factor of the amplifier 501. The power supply voltage of the voltage V1 and the reference voltage GND are supplied from the pad electrode 300-4 to the signal processing drive control unit 931 via the power supply line 804. The signal processing drive control unit 931 is connected to the signal processing control unit 930 via a control line 932. The signal processing control unit 930 is connected to the amplifier 501 via an interconnection 933, a connecting portion 400-33, and the gain control line 506. A control signal for controlling the voltage amplification factor of each block generated by the signal processing drive control unit 931 is input to the signal processing control unit 930 via a control line 932. The voltage amplification factor for each block may be controlled, for example, according to the accumulation time controlled for each pixel block, the voltage conversion rate of the charge to be read out, the amount of light of the object, and the like.

The signal processing control unit 930 has a function similar to that of the signal processing control units 511 and 917. The power supply voltage of the voltage V1 and the reference voltage GND are supplied from the pad electrode 300-4 via the power supply line 804 to the signal processing control unit 930, and the power supply voltage of the voltage V2 and the reference voltage GND are supplied from the pad electrode 300-6 via a power supply line 806. A control signal of the voltage amplification factor generated by the signal processing control unit 930 is supplied to the amplifier 501 via the interconnection 933, the connecting portion 400-33, and the gain control line 506.

The digital signal processing unit 940 has a function of performing various digital signal processing such as noise reduction processing, digital gain processing, addition/subtraction of offset, compression processing, and scrambling processing of data on the digital signal held in the signal processing unit 500. The power supply voltage of the voltage V1 and the reference voltage GND are supplied from a pad electrode 300-8 to the digital signal processing unit 940 via a power supply line 808. The digital signal processing unit 940 may require a clock signal of a constant frequency for signal processing operation. In this reference example, a clock signal is supplied from the outside, and the clock signal is supplied from a pad electrode 300-11 to the digital signal processing unit 940 via an interconnection 811. Although not illustrated in FIG. 3, as another control signal, a control signal from the outside of the imaging device, for example, a control signal such as serial communication from an external controller (not illustrated) may be supplied to the digital signal processing unit 940. The same applies to the drive timing control unit 900 and the signal processing drive control unit 931 described above.

The pixel signals on which the A/D conversion is performed in the signal processing unit 500 are held in a digital memory of the signal processing unit 500. The digital signal processing unit 940 inputs a selection signal for selecting a digital memory from which a digital signal is read out to the signal processing unit 500 via a control line 941, a connecting portion 400-34, and the control line 516. The signal processing unit 500 reads out the digital signal held in the selected digital memory to the digital signal processing unit 940 via an output line 517, a connecting portion 400-35, and an interconnection 942. The voltage amplitude of the digital signal is based on the voltage V1. The pixel signal subjected to the digital signal processing in the digital signal processing unit 940 is output to the outside of the imaging device via an interconnection 943, a connecting portion 400-36, the signal input line 701, and the output unit 700.

The reference voltage generation unit 600 disposed on the first substrate 10 is supplied with a power supply voltage and a reference voltage GND from a pad electrode 300-2 via a power supply line 802, the connecting portion 400-2, and the power supply line 601. Further, a control signal is input from the drive timing control unit 900 to the reference voltage generation unit 600 via an interconnection 911, a connecting portion 400-40, and the control line 602. The voltage generated by the reference voltage generation unit 600 is supplied to the pixel control unit 120 via the output line 603, and is output to the outside of the imaging device via the output line 603, a connecting portion 400-3, an interconnection 803, and a pad electrode 300-3. The pad electrode 300-3 serves as a test terminal for testing that the reference voltage generation unit 600 generates a desired voltage, and serves as an electrode for inputting a reference voltage in a mode in which the reference voltage is input from the outside. Further, by connecting a capacitor to the outside of the imaging device, it is possible to suppress a variation in the reference voltage caused by the operation of the imaging device.

FIG. 6 is a diagram more specifically illustrating connections between the amplifier 501 and the signal processing control unit 930 and connections of power supply lines among connections via the connecting portion 400 in FIG. 2 and FIG. 3. Although FIG. 6 illustrates a structure in which each of the connecting portions 400 is connected via one connecting portion 400, the connecting portions 400 may be connected in parallel via a plurality of connecting portions 400 in order to reduce the resistance of the connecting portions 400 or to make the connecting portions 400 redundant.

The signal processing control unit 930 may include an operation unit 934 for generating a control signal and a driving unit 935 for driving the amplifier 501. A signal for controlling the voltage amplification factor of each block is input from the signal processing drive control unit 931 to the operation unit 934 via the control line 932. The operation unit 934 generates a signal for controlling the amplifier 501 in accordance with a control signal from the signal processing drive control unit 931. The operation unit 934 handles a signal having the same voltage V1 as the signal processing drive control unit 931. Therefore, the power supply voltage (voltage V1) and the reference voltage GND are supplied from the pad electrode 300-4 to the operation unit 934 via the power supply line 804. Specifically, a power supply voltage (voltage V1) is supplied from a pad electrode 300-4-1 via a power supply line 804-1, and a reference voltage GND is supplied from a pad electrode 300-4-2 via a power supply line 804-2 to the operation unit 934. The control signal generated by the operation unit 934 is input to the driving unit 935 of the signal processing control unit 930.

The driving unit 935 drives the amplifier 501 operating at the voltage V2. Therefore, the power supply voltage (voltage V2) and the reference voltage GND are supplied from the pad electrode 300-6 to the driving unit 935 via the power supply line 806. Specifically, a power supply voltage (voltage V2) is supplied from a pad electrode 300-6-1 via a power supply line 804-1, and a reference voltage GND is supplied from a pad electrode 300-6-2 via a power supply line 804-2 to the driving unit 935. The driving unit 935 has a function of boosting the control signal generated by the operation unit 934 to a voltage corresponding to the voltage V2. The control signal boosted by the driving unit 935 is input to the amplifier 501 via the interconnection 933, the connecting portion 400-33, and the gain control line 506.

The amplifier 501 is supplied with the power supply voltage of the voltage V2 and the reference voltage GND from a pad electrode 300-7 via a power supply line 807. Specifically, a power supply voltage (voltage V2) is supplied from a pad electrode 300-7-1 to the amplifier 501 via a power supply line 807-1, and a reference voltage GND is supplied from a pad electrode 300-7-2 via a power supply line 807-2.

Although the power supply voltages supplied from the pad electrodes 300-6 and 300-7 are both the voltage V2, here, individual pad electrodes and power supply interconnections are provided for the driving unit 935 and the amplifier 501 to separate the power supply. With this configuration, crosstalk via a power supply between circuits which operate differently can be prevented. As a configuration of the power supply isolation, a configuration may be adopted in which the pad electrodes and the power supply interconnections are separated as in the present reference example, or a configuration may be adopted in which the power supply interconnections are separated so that the pad electrodes are common and the common impedance becomes low.

In this reference example, the pad electrodes and the power supply interconnections are separated, and the power supply lines connected to the amplifier 501 are connected to the circuit of the first substrate 10 via the connecting portions 400 in the vicinity of the pad electrodes. Thus, the influence of crosstalk via the coupling capacitance between the power supply interconnections arranged on the second substrate 20 can also be reduced.

However, in the imaging device according to this reference example, the control signal boosted by the driving unit 935, i.e., the control signal output to the gain control line 506, may be affected by the power supply variation of the power supply line 806 connected to the driving unit 935. Factors of power supply variation of the power supply line 806 include crosstalk due to parasitic capacitance between the power supply line 806 and another interconnection provided on the second substrate 20, variation accompanying operation of another circuit connected to the power supply line 806, and the like. The variation of the control signal in the gain control line 506 may act on the negative feedback path of the amplifier circuit 502 via the parasitic capacitance between the gate electrode and the source/drain electrodes of the transistor constituting the switch M1 of the amplifier 501, and may affect the operation of the amplifier 501. For example, a variation in the control signal in the gain control line 506 appears as an error in the voltage amplification factor of the pixel signal processed by the amplifier 501 and an offset in the output, and as a result, may cause deterioration in image quality. In particular, in general, a circuit for controlling the driving timing classified as a digital circuit and a circuit for processing and controlling a digital signal at a predetermined frequency are disposed on the second substrate 20. Normally, the power supply variation of the digital circuit is large, and it is necessary to consider a configuration that reduces the influence on the image quality.

Figure 7:
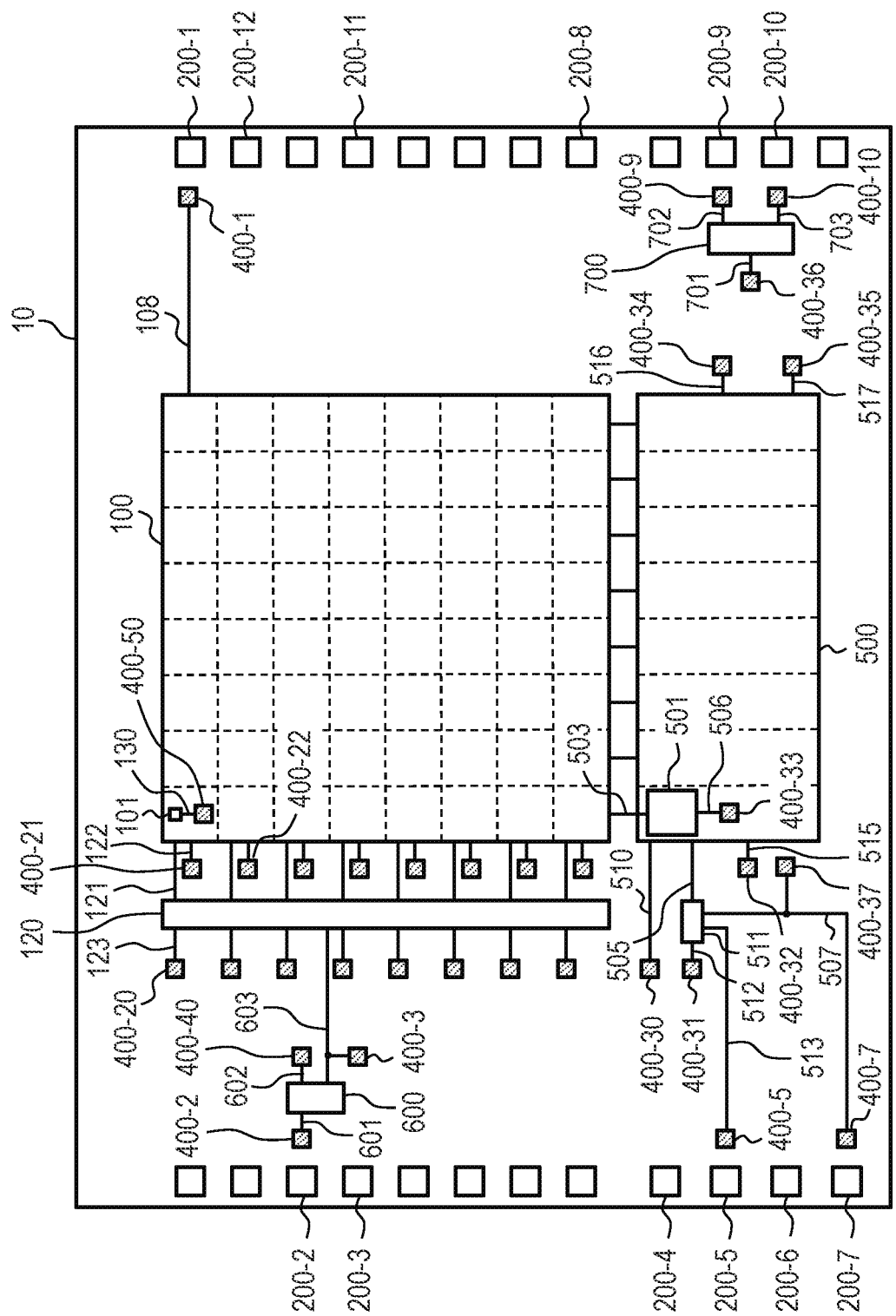
FIG. 7 and FIG. 8 are schematic plan views illustrating a schematic configuration of the imaging device according to the first embodiment of the present invention.
Figure 8:
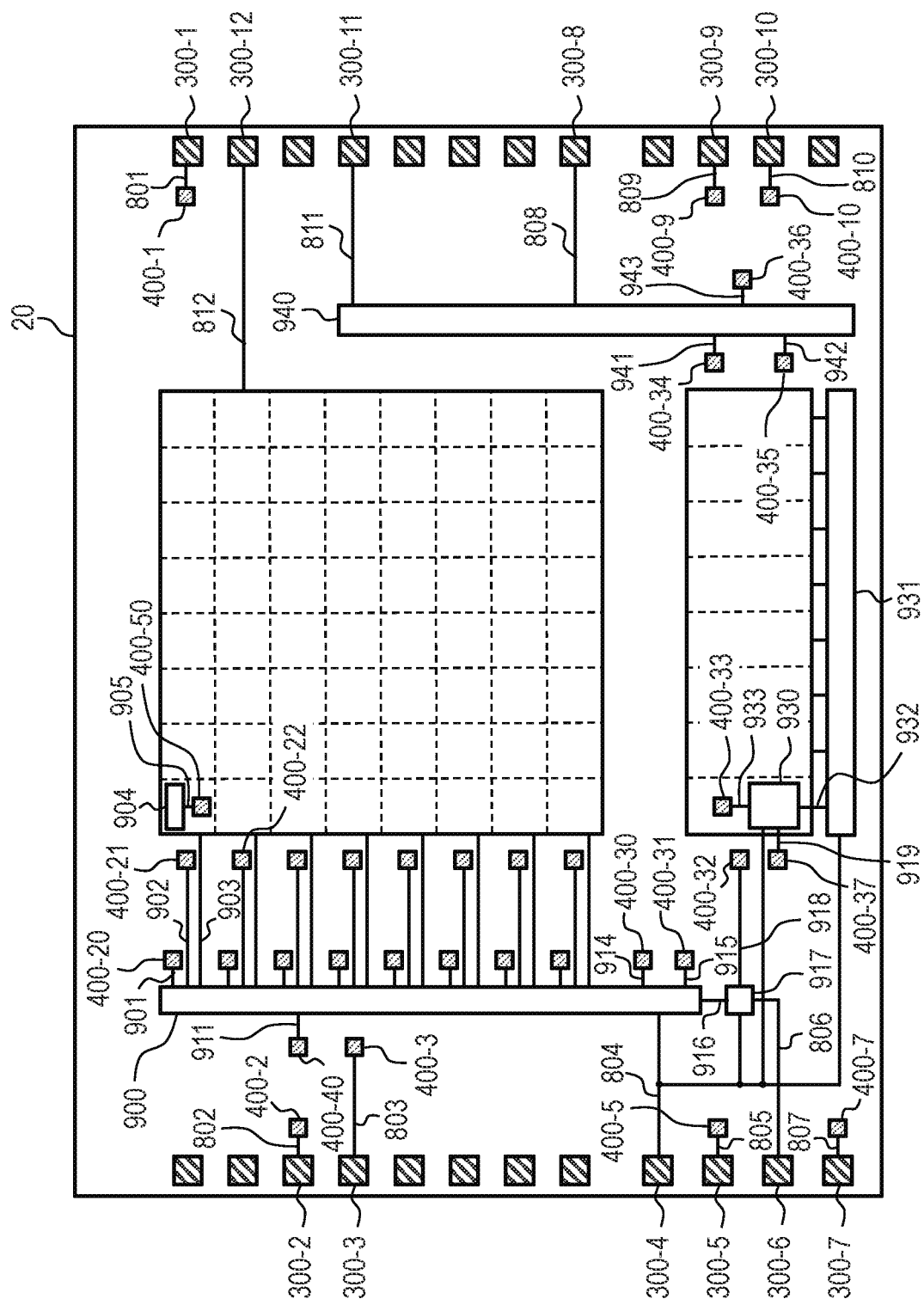
Figure 9:
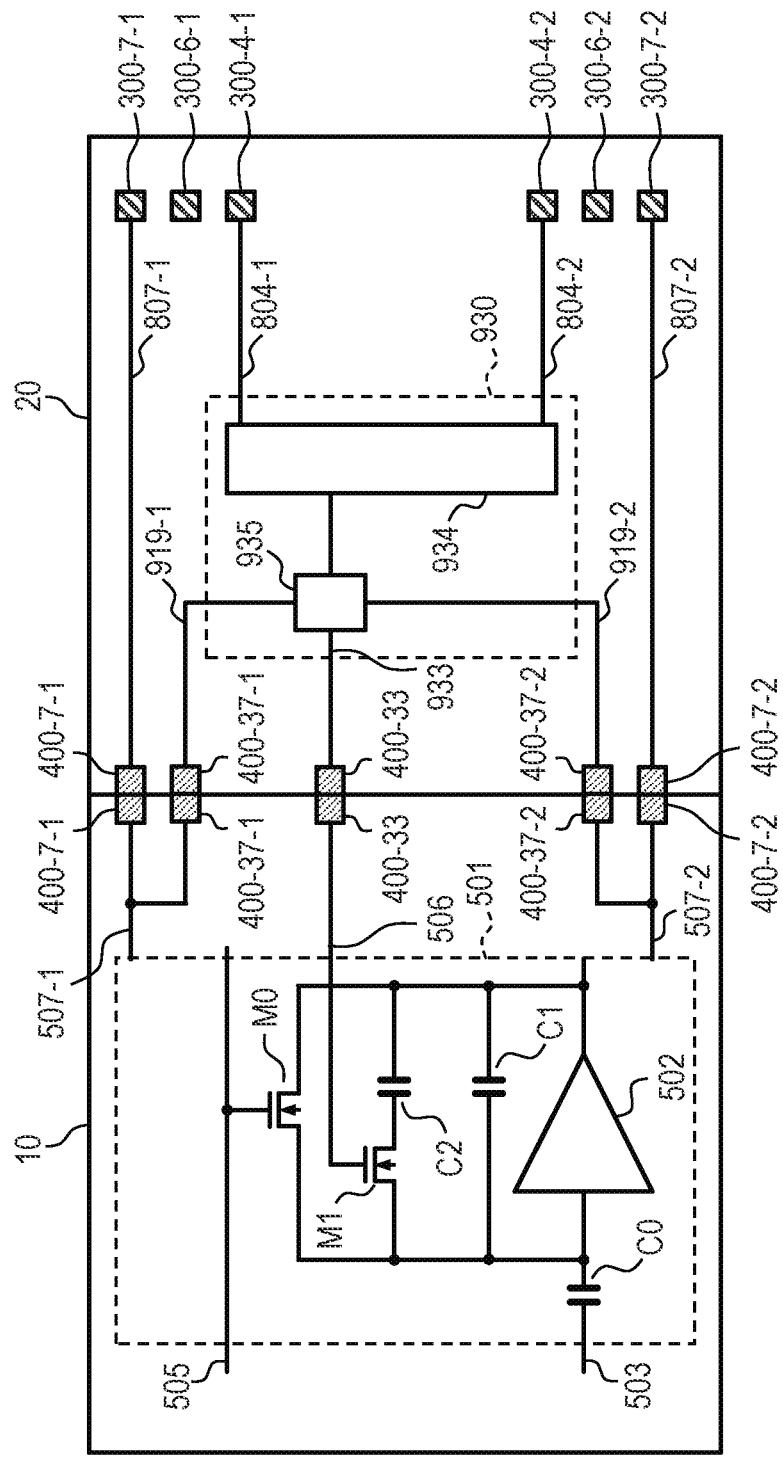
FIG. 9 is a schematic view illustrating a configuration example of a connecting portion in the imaging device according to the first embodiment of the present invention.

Next, the configuration of the imaging device according to the present embodiment will be described with reference to FIG. 7 to FIG. 9. FIG. 7 and FIG. 8 are schematic plan views illustrating a schematic configuration of the imaging device according to the present embodiment. FIG. 9 is a circuit diagram illustrating a connection relationship between an amplifier and a signal processing control unit in the imaging device according to the present embodiment. Components similar to those of the imaging device according to the reference example illustrated in FIG. 2 to FIG. 6 are denoted by the same reference numerals, and description thereof will be omitted or simplified. The imaging device according to the present embodiment is an example in which the influence of power supply fluctuation of the power supply line 806 via the driving unit 935 on the operation of the amplifier 501 is reduced.

As illustrated in FIG. 7 and FIG. 8, in the imaging device according to the present embodiment, the power supply voltage of the voltage V1 and the reference voltage GND are supplied to the signal processing control unit 930 from the pad electrode 300-4 via the power supply line 804 as in the case of the imaging device according to the reference example. On the other hand, unlike the case of the imaging device according to the reference example, the power supply voltage and the reference voltage of the voltage V2 to the signal processing control unit 930 are supplied from the pad electrode 300-7 via the power supply line 807, the connecting portion 400-7, the power supply line 507, a connecting portion 400-37, and an interconnection 919. That is, the power supply voltage of the voltage V2 and the reference voltage GND to the signal processing control unit 930 are supplied via a part of a power supply line used for supplying power to the amplifier 501.

FIG. 9 is a diagram more specifically illustrating connections between the amplifier 501 and the signal processing control unit 930 and connections of power supply lines among connections via the connecting portion 400 in FIG. 7 and FIG. 8. Note that although FIG. 9 illustrates a structure in which each of the connecting portions 400 is connected via one connecting portion 400, the connecting portions 400 may be connected in parallel via a plurality of connecting portions 400 in order to reduce resistance or redundancy of the connecting portions 400.

A power supply voltage is supplied to the driving unit 935 of the signal processing control unit 930 via the pad electrode 300-7-1, the power supply line 807-1, the connecting portion 400-7-1, the power supply line 507-1, an connecting portion 400-37-1, and an interconnection 919-1. A reference voltage GND is supplied to the driving unit 935 via the pad electrode 300-7-2, the power supply line 807-2, the connecting portion 400-7-2, the power supply line 507-2, a connecting portion 400-37-2, and an interconnection 919-2.

Although the power supply line 807 extends on the second substrate 20 in FIG. 9, as illustrated in FIG. 2 and FIG. 6, the power supply line 807 is connected to the connecting portion 400-7 in the vicinity of the pad electrode 300-7 in the planar layout, and is connected to the power supply line 507 provided on the first substrate 10. Further, the connecting portion 400-37 may be disposed at a plurality of positions with respect to the power supply line 507-2 disposed on the first substrate 10 and the interconnection 919 disposed on the second substrate 20 in order to reduce the resistance of the interconnection or the connecting portion. Further, the connecting portions 400-37 may be arranged in accordance with the arrangement of the blocks of the signal processing unit 500 and the signal processing control unit 930, or may be arranged at a plurality of locations regardless of the arrangement of the blocks of the signal processing unit 500 and the signal processing control unit 930. In the present embodiment, a plurality of signal processing control units 930 are disposed corresponding to the blocks of the signal processing unit 500. The interconnection 919 disposed on the second substrate 20 may be a common interconnection for connecting the plurality of signal processing control units 930 and the connecting portions 400-37, or may be a plurality of interconnections for connecting each of the plurality of signal processing control units 930 and the connecting portions 400-37.

As described above, in the imaging device of the present embodiment, a part of the power supply of the signal processing control unit 930 that controls and drives the amplifier 501 is supplied via the power supply interconnection of the amplifier 501 disposed on the first substrate 10. With this configuration, it is possible to suppress the variation of the driving signal output from the signal processing control unit 930 due to the power supply variation of the interconnection and the circuit arranged on the second substrate 20, and to reduce the influence on the operation of the amplifier 501.

In addition, a capacitor (not illustrated) may be disposed in at least one of the first substrate 10 and the second substrate 20 and connected to the power supply line 507 or the interconnection 919. With such a structure, in the structure in which power supplies are shared between the substrates as in the present embodiment, the influence of power supply variation due to operation of the circuit provided in each substrate may be reduced. The position of the capacitor arranged in each substrate is not particularly limited, but, for example, the vicinity of the pad electrode 300, the vicinity of the connecting portion 400, and the vicinity of the circuit to which the power source is connected are effective.

In other words, the imaging device according to the present embodiment includes the first substrate 10 provided with a first circuit unit, and the second substrate 20 provided with a second circuit unit connected to the first circuit unit and a third circuit unit connected to the second circuit unit. The second circuit unit is configured to supply a driving voltage to the first circuit unit, and at least a part of driving voltages of the second circuit unit is supplied to the second circuit unit from a side of the first substrate 10. In the present embodiment, the first circuit unit, the second circuit unit, and the third circuit unit correspond to the amplifier 501, the driving unit 935, and the operation unit 934, respectively. The driving unit 935 is a level shift circuit that shifts a level of a signal input from the third circuit unit to a level corresponding to the first circuit unit. Note that the driving voltage is a voltage signal used for driving a circuit, such as a power supply (a power supply voltage and a reference voltage), a control signal, a clock signal, and the like.

In the present embodiment, the signal processing control unit 930 for controlling the pixel unit 100 in the signal processing unit 500 in units of pixel blocks has been described. When the voltage amplification factor of the signal processing unit 500 is changed in units of pixel blocks as in the present embodiment, the voltage amplification factor may be switched during vertical readout scanning of the pixels 101. In this case, the response of the amplifier 501 to the control of the voltage amplification factor may affect the readout time, i.e., the frame rate. Therefore, when the signal processing unit 500 is controlled for each block, by providing a control unit in the vicinity of each block, the reflection of the control and the response time may be shortened, and the influence on the readout time may be reduced. On the other hand, when the control unit is provided for each block, the power supply interconnection of the control unit becomes longer in proportion to the area of the signal processing unit 500, the coupling capacitance with the other interconnections increases, and consequently, the influence of crosstalk via the coupling capacitance increases.

However, in the present embodiment, the power supply of the control unit is supplied not from the second substrate 20 in which a relatively larger number of digital circuits are arranged than the first substrate 10 but via the first substrate 10. Thus, the influence on the circuit due to power supply variation or the like may be reduced, and degradation of image quality may be suppressed.

Although the configuration in which the pixels and the signal processing circuits are controlled for each block has been described in the present embodiment, the pixels and the signal processing circuits need not necessarily be controlled for each block. Similarly to the signal processing control unit 930, the signal processing control unit 917 disposed on the second substrate 20 may also be configured to supply the power supply voltage and the reference voltage supplied from the pad electrode 300-6 via the power supply line 806 from the pad electrode 300-7 via the first substrate 10. Also in this case, the same effect as in the case of the signal processing control unit 930 may be obtained. Although the power supply of the control unit that controls the voltage amplification factor of the amplifier has been described in the present embodiment, other control units may have the same configuration.

As described above, according to the present embodiment, in the semiconductor device formed by stacking a plurality of substrates, it is possible to suppress noise contamination due to crosstalk between the substrates and deterioration of operation accuracy.

Second Embodiment

Figure 10:
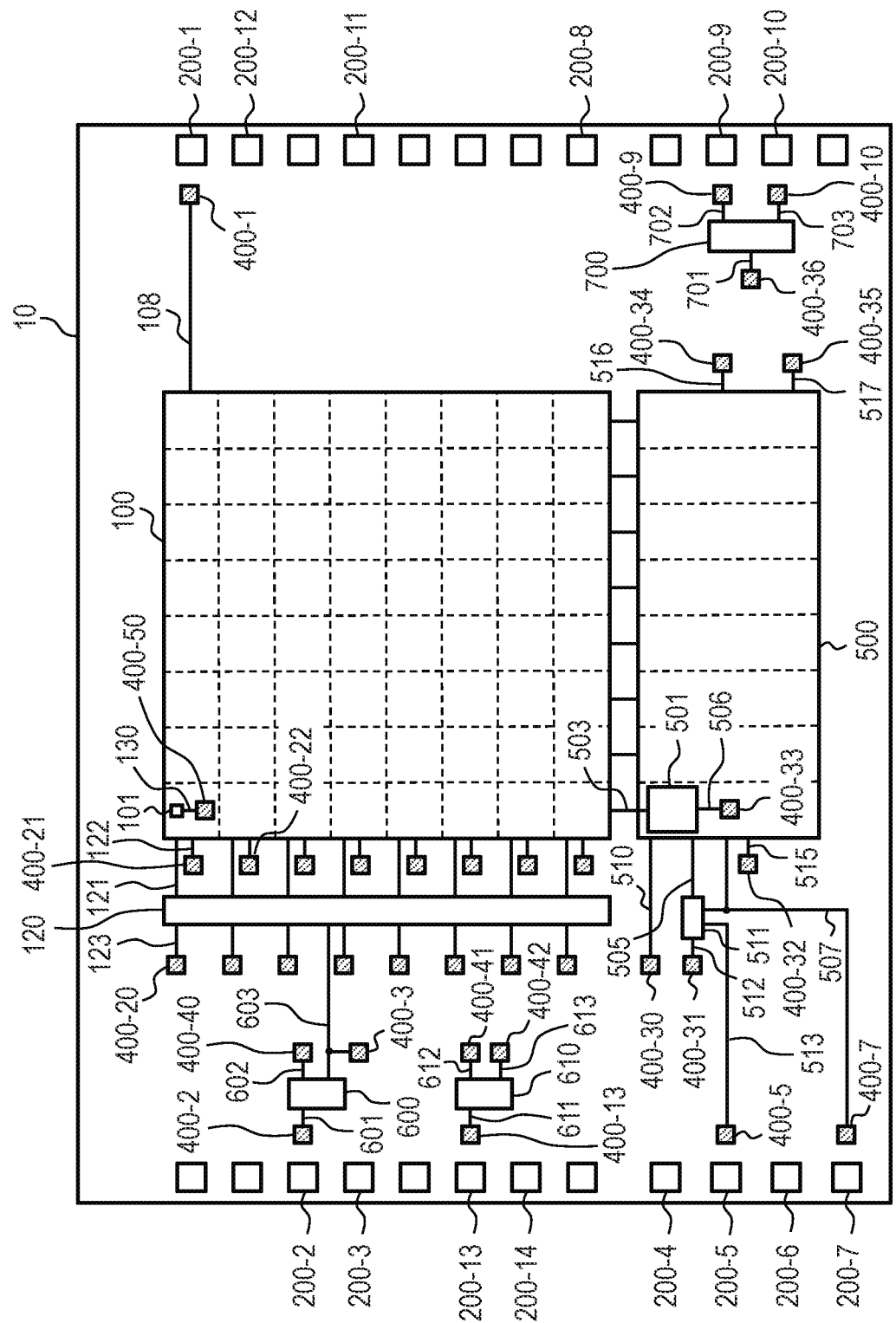
FIG. 10 and FIG. 11 are schematic plan views illustrating a schematic configuration of an imaging device according to a second embodiment of the present invention.
Figure 11:
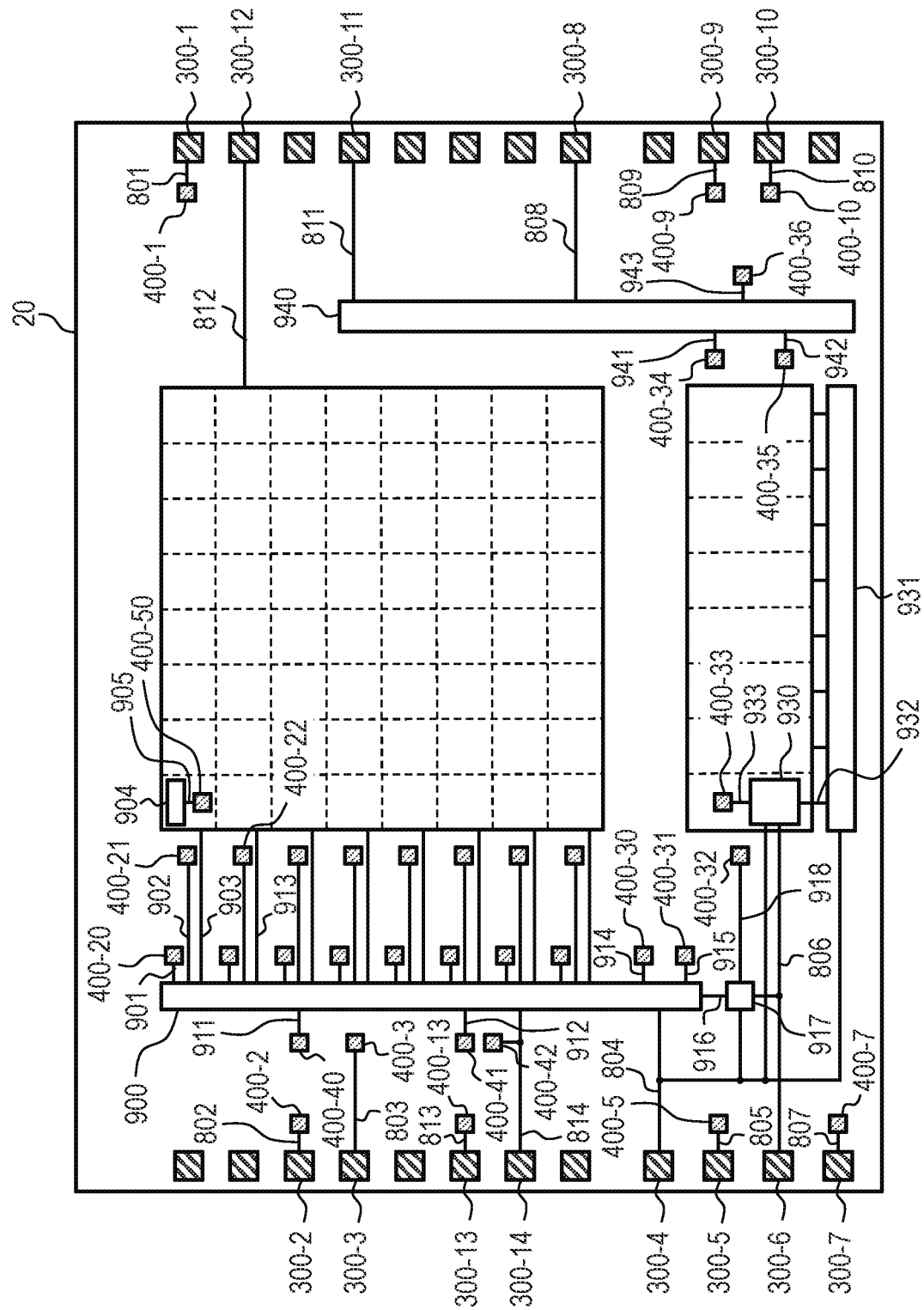
Figure 12:
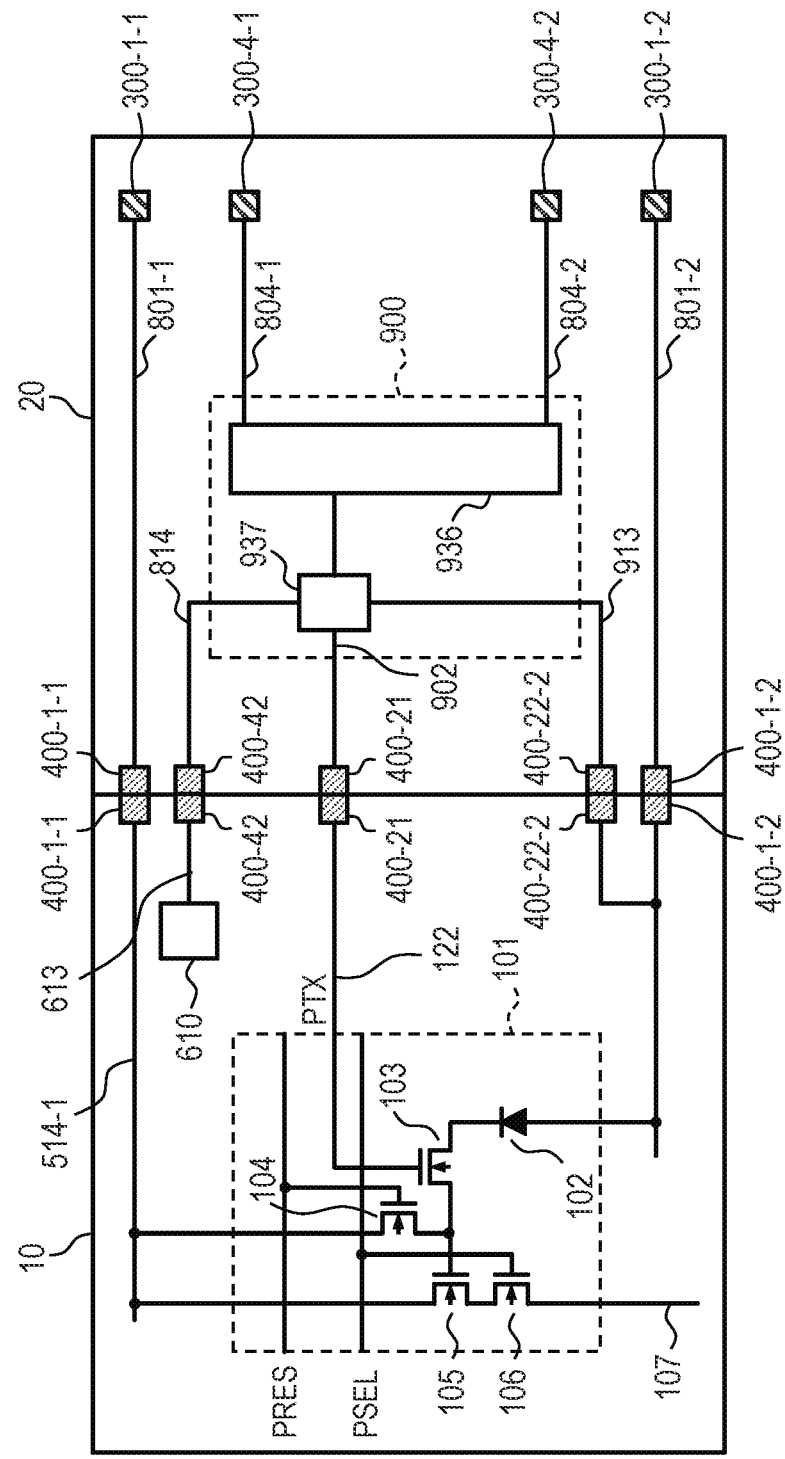
FIG. 12 is a schematic view illustrating a configuration example of a connecting portion in the imaging device according to the second embodiment of the present invention.

An imaging device according to a second embodiment of the present invention will be described with reference to FIG. 10 to FIG. 12. Components similar to those of the imaging device according to the first embodiment are denoted by the same reference numerals, and description thereof will be omitted or simplified. FIG. 10 and FIG. 11 are schematic plan views illustrating a schematic configuration of the imaging device according to the present embodiment. FIG. 12 is a circuit diagram illustrating a connection relationship between pixels and a drive timing control unit in the imaging device according to the present embodiment.

The imaging device according to the present embodiment further includes a reference voltage generation unit 610 disposed on the first substrate 10 in addition to the components described in the first embodiment. The imaging device according to the present embodiment has the same configuration as that of the imaging device according to the first embodiment except for the portion relating to the reference voltage generation unit 610, and therefore, the following description focuses on differences from the imaging device according to the first embodiment.

As illustrated in FIG. 10, the reference voltage generation unit 610 is disposed on the first substrate 10. Similar to the reference voltage generation unit 600, the reference voltage generation unit 610 has a function of generating a reference voltage relating to driving of the pixel unit 100.

As illustrated in FIG. 10 and FIG. 11, a power supply voltage and a reference voltage GND are supplied from a pad electrode 300-13 to the reference voltage generation unit 610 via a power supply line 813, a connecting portion 400-13, and a power supply line 611. Further, a control signal for controlling the setting of the voltage generated by the reference voltage generation unit 610 or the like is supplied from the drive timing control unit 900 to the reference voltage generation unit 610 via an interconnection 912, a connecting portion 400-41, and a control line 612. The voltage generated by the reference voltage generation unit 610 is supplied to the drive timing control unit 900 via an output line 613, a connecting portion 400-42, and an interconnection 814, and is output to the outside of the imaging device via the interconnection 814 and a pad electrode 300-14. The pad electrode 300-14 serves as a test terminal for testing that the reference voltage generation unit 610 generates a desired voltage, and serves as a pad electrode for inputting a reference voltage in a mode in which the reference voltage is input from the outside. Further, by connecting a capacitor to the outside of the imaging device, power supply fluctuation accompanying operation of the imaging device may be suppressed.

FIG. 12 is a diagram more specifically illustrating connections of the pixel 101, the reference voltage generation unit 610, and the drive timing control unit 900 and connections of power supply lines among connections via the connecting portion 400 in FIG. 10 and FIG. 11. In the present embodiment, the accumulation time of each pixel 101 is controlled by a control signal input from the drive timing control unit 900 to the pixel unit 100 via the control line 902, the connecting portion 400-21, and the pixel control line 122. In the present embodiment, one of the power supply voltage and the reference voltage GND supplied from the pad electrode 300-1 to the pixel unit 100 is supplied to the drive timing control unit 900 via a part of the connecting portion 400-21. FIG. 10 to FIG. 12 illustrate a part of the connecting portion 400-21 as a connecting portion 400-22. Further, in order to simplify the drawing, in FIG. 12, a power supply line 611 for supplying power voltage to the reference voltage generation unit 610 is omitted.

The accumulation operation of the pixel 101 is performed by driving the transfer transistor 103 and the reset transistor 104. For example, first, the transfer transistor 103 and the reset transistor 104 are turned on at the same time to reset the photoelectric conversion element 102. The timing at which the transfer transistor 103 is turned off after the reset of the photoelectric conversion element 102 is the start time of the accumulation period. After a predetermined accumulation period has elapsed, the transfer transistor 103 is turned on to transfer charge accumulated in the photoelectric conversion element 102 during the accumulation period to the floating diffusion FD. The timing at which the transfer transistor 103 is turned on to transfer charge is the end time of the accumulation period. The transfer transistor 103 is controlled by a control signal PTX supplied from the drive timing control unit 900 via the control line 902, the connecting portion 400-21, and the pixel control line 122. Note that the control of the transfer transistor 103 may be controlled by a reference voltage other than the power supply voltage and the reference voltage GND for potential control during charge accumulation operation and charge transfer of the photoelectric conversion element 102.

The drive timing control unit 900 may include an operation unit 936 and a driving unit 937. The drive timing control unit 900 has a function of controlling the accumulation time of the pixel 101 by driving the transfer transistor 103 by the control signal PTX supplied via the control line 902, the connecting portion 400-21, and the pixel control line 122. The operation unit 936 operates with a power supply voltage of the voltage V1. To drive the transfer transistor 103, one of a power supply voltage (voltage V1), a reference voltage GND, and a reference voltage (low voltage, high voltage) different from the reference voltage GND is supplied as an operation voltage to the driving unit 937. In the present embodiment, it is assumed that the high voltage of the driving unit 937 is a voltage generated by the reference voltage generation unit 610. The voltage generated by the reference voltage generation unit 610 is supplied to the driving unit 937 via the output line 613, the connecting portion 400-42, and the interconnection 814. The low voltage of the driving unit 937 is assumed to be the reference voltage GND. Similarly to the first embodiment, the driving unit 937 is supplied with the reference voltage GND from the pad electrode 300-1-2 via the power supply line 801-2, a connecting portion 400-1-2, a connecting portion 400-22-2, and an interconnection 913. Note that in addition to the above structure, a structure in which the low voltage of the driving unit 937 is a reference voltage or a structure in which the high voltage of the driving unit 937 is a power supply voltage may be used. Alternatively, two reference voltage generation units corresponding to the low voltage and the high voltage may be disposed on the first substrate 10.

The operation accuracy of charge transfer by the transfer transistor 103 is one of important performances of the imaging device. Therefore, the voltage generated by the reference voltage generation unit 610 is required to have high accuracy of the voltage value and low noise. Each of the circuits arranged over the same substrate may be affected by parasitic capacitance formed between semiconductor regions where the substrate and the element are arranged, parasitic capacitance between interconnections, or an adjacent circuit which generates heat in accordance with driving. In the present embodiment, the second substrate 20 is provided with a circuit for controlling the driving timing and a circuit for controlling the digital signal at a predetermined frequency, which are classified as digital circuits. The power supply variation of the digital circuit is large, and the amount of heat generated becomes large when the driving frequency is high, and the influence on the adjacent circuit becomes large.

From such a viewpoint, in the present embodiment, the imaging device is configured such that the variation of the reference voltage GND of the driving unit 937 does not affect the operation of the pixel 101 via the gate electrode of the transfer transistor 103. Specifically, the reference voltage generation unit 610 is disposed on the first substrate 10, and the reference voltage generated by the reference voltage generation unit 610 is supplied to the drive timing control unit 900 of the second substrate 20. As a result, the pixel 101 may be driven with a reference voltage having a higher voltage value accuracy and lower noise than the case where the reference voltage generation unit 610 is disposed on the second substrate 20, and degradation of the performance related to charge transfer of the pixel 101 may be suppressed.

In other words, the imaging device according to the present embodiment includes the first substrate 10 provided with a first circuit unit, and the second substrate 20 provided with a second circuit unit connected to the first circuit unit and a third circuit unit connected to the second circuit unit. The second circuit unit is configured to supply a driving voltage to the first circuit unit, and at least a part of driving voltages of the second circuit unit is supplied to the second circuit unit from a side of the first substrate 10. In the present embodiment, the first circuit unit, the second circuit unit, and the third circuit unit correspond to the pixel 101, the driving unit 937, and the operation unit 936, respectively. The driving unit 937 is a level shift circuit that shifts a level of a signal input from the third circuit unit to a level corresponding to the first circuit unit.

As described in the first embodiment, w % ben the pixel control unit 904 controls the accumulation time of the pixels 101 for each block, the connection relationship with the reference voltage generation unit 610 may be the same. Although the accumulation operation of the pixel 101 has been described in the present embodiment, the same configuration may be applied to the driving control of the reset transistor 104 and the select transistor 106.

As described above, according to the present embodiment, in the semiconductor device formed by stacking a plurality of substrates, it is possible to suppress noise contamination due to crosstalk between the substrates and deterioration of operation accuracy.

Third Embodiment

Figure 13:
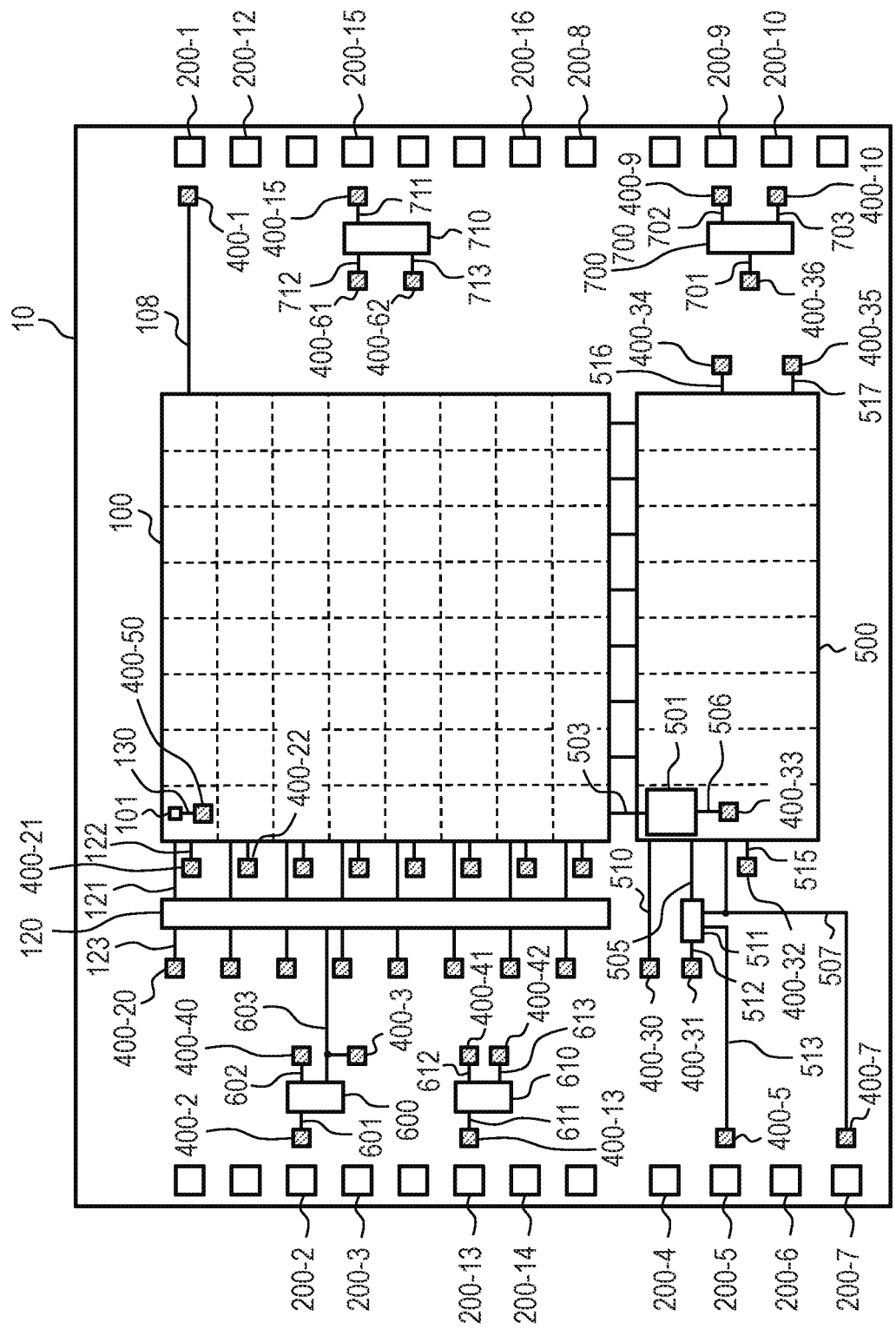
FIG. 13 and FIG. 14 are schematic plan views illustrating a schematic configuration of an imaging device according to a third embodiment of the present invention.
Figure 14:
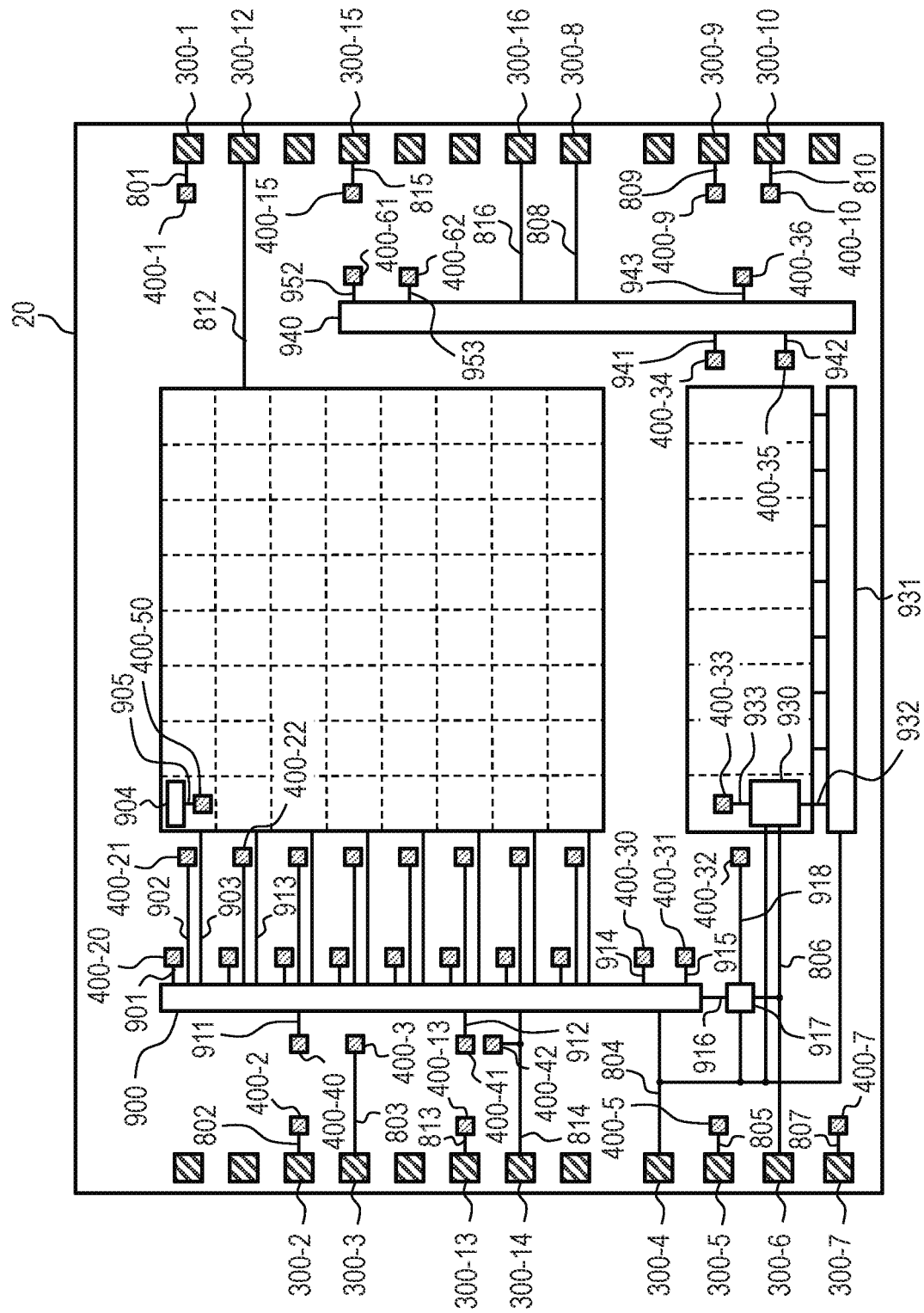
Figure 15:
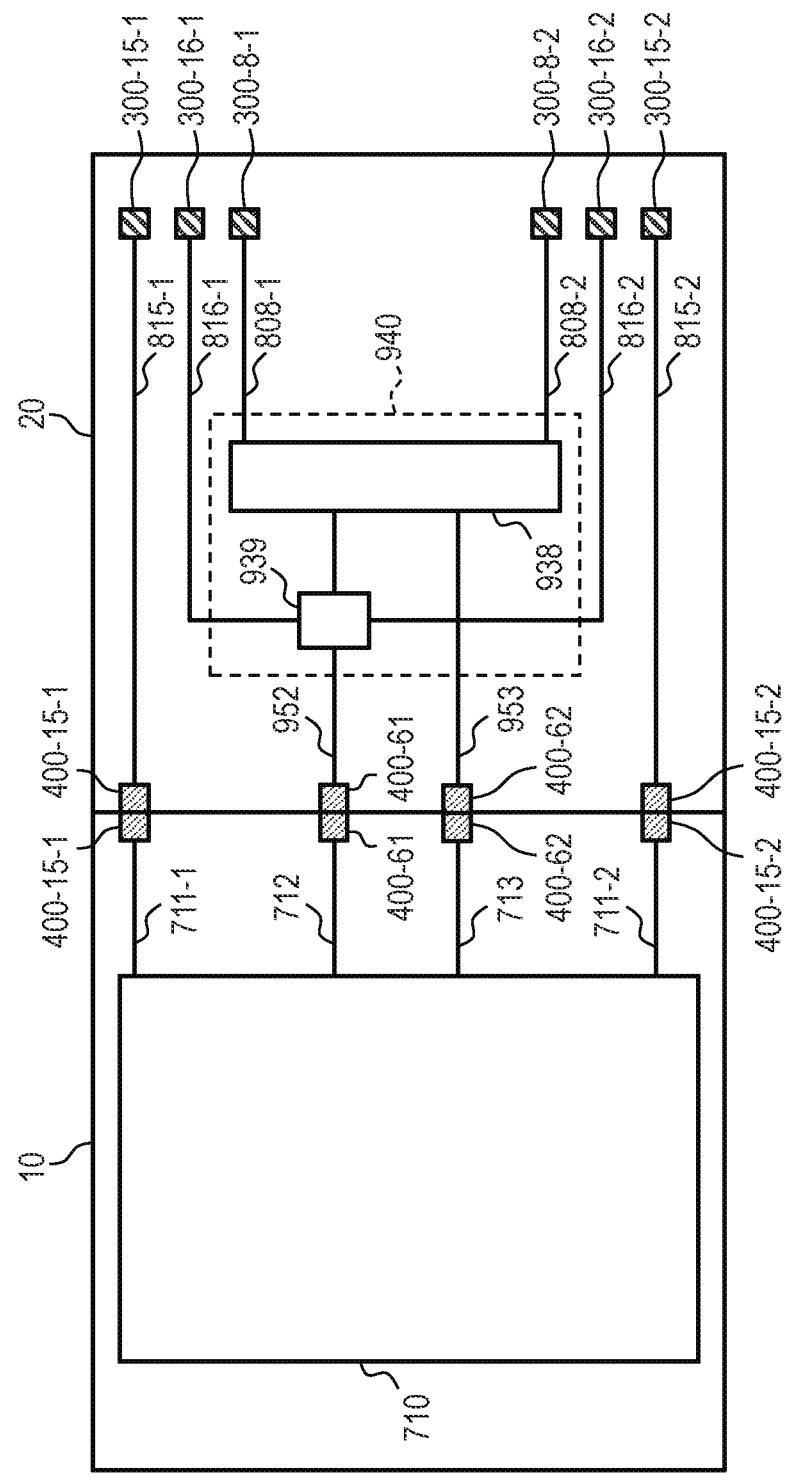
FIG. 15 is a schematic diagram illustrating a configuration example of a connecting portion in an imaging device according to a third embodiment of the present invention.

An imaging device according to a third embodiment of the present invention will be described with reference to FIG. 13 to FIG. 15. The same components as those of the imaging device according to the first or second embodiment are denoted by the same reference numerals, and description thereof will be omitted or simplified. FIG. 13 and FIG. 14 are schematic plan views illustrating a schematic configuration of the imaging device according to the present embodiment. FIG. 15 is a circuit diagram illustrating a connection relationship between a clock generation unit and a digital signal processing unit in the imaging device according to the present embodiment.

The imaging device according to the present embodiment further includes a clock generation unit 710 disposed on the first substrate 10 in addition to the components described in the second embodiment. The imaging device according to the present embodiment has the same configuration as that of the imaging device according to the second embodiment except for the portion relating to the clock generation unit 710, and therefore, the following description focuses on the differences from the imaging device according to the second embodiment.

As illustrated in FIG. 13, the clock generation unit 710 is disposed on the first substrate 10. The clock generation unit 710 generates a clock signal for driving the digital signal processing unit 940 disposed on the second substrate 20. Although an example in which the clock signal is supplied from the clock generation unit 710 to the digital signal processing unit 940 is described in the present embodiment, the same clock signal may be supplied to the drive timing control unit 900 or the signal processing drive control unit 931. Alternatively, a clock generation unit corresponding to each of the drive timing control unit 900 and the signal processing drive control unit 931 may be provided separately from the clock generation unit 710.

In the first embodiment, the imaging device is configured such that a clock signal for driving the digital signal processing unit 940 is input from the outside of the imaging device via the pad electrode 300-11. On the other hand, in the present embodiment, since the clock signal for driving the digital signal processing unit 940 is generated in the clock generation unit 710, the pad electrode 300-11 described in the first and second embodiments is unnecessary. In the present embodiment, this pad electrode is used as a pad electrode 300-15 for supplying a power supply voltage and a reference voltage for driving the clock generation unit 710.

As illustrated in FIG. 13 and FIG. 14, a power supply voltage and a reference voltage are supplied from the pad electrode 300-15 to the clock generation unit 710 via a power supply line 815, a connecting portion 400-15, and a power supply line 711. A control signal for controlling the setting of the frequency of the clock signal generated by the clock generation unit 710 is input from the digital signal processing unit 940 to the clock generation unit 710 via an interconnection 952, a connecting portion 400-61, and a control line 712. The clock signal generated by the clock generation unit 710 is supplied to the digital signal processing unit 940 via an output line 713, a connecting portion 400-62, and an interconnection 953. In the present embodiment, the power supply voltage is supplied from the pad electrode 300-8 to the digital signal processing unit 940 via the power supply line 808, and a reference voltage GND is supplied from a pad electrode 300-16 via the power supply line 816.

FIG. 15 is a diagram more specifically illustrating connections between the clock generation unit 710 and the digital signal processing unit 940 and connections of power supply lines among connections via the connecting portion 400 in FIG. 13 and FIG. 14.

The digital signal processing unit 940 may include an operation unit 938 and a driving unit 939. A power supply voltage is supplied from a pad electrode 300-8-1 via a power supply line 808-1, and a reference voltage GND is supplied from a pad electrode 300-8-2 via a power supply line 808-2 to the operation unit 938. A power supply voltage is supplied from a pad electrode 300-16-1 via a power supply line 816-1, and a reference voltage GND is supplied from a pad electrode 300-16-2 via the power supply line 816-2 to the driving unit 939.

The power supply voltage is supplied from a pad electrode 300-15-1 to the clock generation unit 710 via a power supply line 815-1, a connecting portion 400-15-1, and a power supply line 711-1. The reference voltage GND is supplied from a pad electrode 300-15-2 to the clock generation unit 710 via a power supply line 815-2, a connecting portion 400-15-2, and a power supply line 711-2. A control signal for controlling the frequency of the clock signal generated by the clock generation unit 710 is input to the clock generation unit 710 from the driving unit 939 of the digital signal processing unit 940 via the interconnection 952, the connecting portion 400-61, and the control line 712. The clock signal generated by the clock generation unit 710 is supplied to the operation unit 938 of the digital signal processing unit 940 via the output line 713, the connecting portion 400-62, and the interconnection 953. The operation unit 938 performs various digital signal processing on the pixel signals input from the signal processing unit 500 based on the clock signal supplied from the clock generation unit 710.

In the present embodiment, the power supply voltage and the reference voltage GND of the operation unit 938 are separated from the power supply voltage and the reference voltage GND of the driving unit 939, but this configuration may be appropriately changed according to the operation voltage of the clock generation unit 710. For example, when the operation voltage of the clock generation unit 710 and the amplitude of the generated clock signal and the operation voltage of the operation unit 938 to which the clock signal is supplied are the same, the power supply voltage and the reference voltage GND of the operation unit 938 may be the same as the power supply voltage and the reference voltage GND of the driving unit 939.

The clock signal generated by the clock generation unit 710 serves as a reference clock for the operation of the digital signal processing unit 940. Noise such as error in the frequency of the reference clock and jitter may cause malfunction of the digital signal processing operation. Therefore, the clock signal generated by the clock generation unit 710 preferably has high frequency accuracy and low jitter. In the present embodiment, the clock generation unit 710 is disposed on the first substrate 10, and the generated clock signal is supplied to the digital signal processing unit 940 of the second substrate 20. Similar to the reference voltage generation unit 610 described in the second embodiment, the configuration in which the clock generation unit 710 is disposed on the first substrate 10 is less susceptible to other circuits, for example, digital circuits than the configuration in which the clock generation unit 710 is disposed on the second substrate 20. Therefore, according to the configuration of the present embodiment in which the clock generation unit 710 is disposed on the first substrate 10, a clock signal with higher frequency accuracy and lower jitter may be generated, and malfunction of the digital signal processing unit 940 in the digital signal processing may be reduced.

In other words, the imaging device according to the present embodiment includes the first substrate 10 provided with a first circuit unit, and the second substrate 20 provided with a second circuit unit connected to the first circuit unit and a third circuit unit connected to the second circuit unit. The second circuit unit is configured to supply a driving voltage to the first circuit unit, and at least a part of driving voltages of the second circuit unit is supplied to the second circuit unit from a side of the first substrate 10. In the present embodiment, the first circuit unit, the second circuit unit, and the third circuit unit correspond to the clock generation unit 710, the driving unit 939, and the operation unit 938, respectively.

In the present embodiment, the power voltage supplied to the clock generation unit 710 is supplied from the pad electrode 300-15. With this configuration, the influence of power supply variation due to operation of another circuit may be reduced. However, since the clock signal generated by the clock generation unit 710 becomes a reference clock of the digital signal processing unit 940, at least a part of the power voltage supplied to the clock generation unit 710 may be shared by the digital signal processing unit 940. When the power supply is shared between the substrates, as described in the first embodiment, it is possible to reduce influence of power supply variation by disposing a capacitor in at least one of the first substrate 10 and the second substrate 20 and connecting the capacitor to the power supply line 711 and the power supply line 815.

Also, the clock generation unit that supplies a clock signal to the drive timing control unit 900 or the signal processing drive control unit 931 has the same configuration as the clock generation unit 710, whereby the same effect as the effect described in the present embodiment may be obtained. The drive timing control unit 900 generates a control signal relating to control of the accumulation time of the pixels 101. For example, when the jitter of the clock signal input to the drive timing control unit 900 is large, it causes an error in the control of the accumulation time, which may cause degradation of image quality such as sensitivity variation among pixels or linearity error with respect to the amount of light of an object. The clock generation unit that supplies the clock signal to the drive timing control unit 900 has the same configuration as that of the clock generation unit 710 described in the present embodiment, whereby the accuracy of the control signal may be maintained and degradation of image quality may be reduced.

As described above, according to the present embodiment, in the semiconductor device formed by stacking a plurality of substrates, it is possible to suppress noise contamination due to crosstalk between the substrates and deterioration of operation accuracy.

Fourth Embodiment

Figure 16:
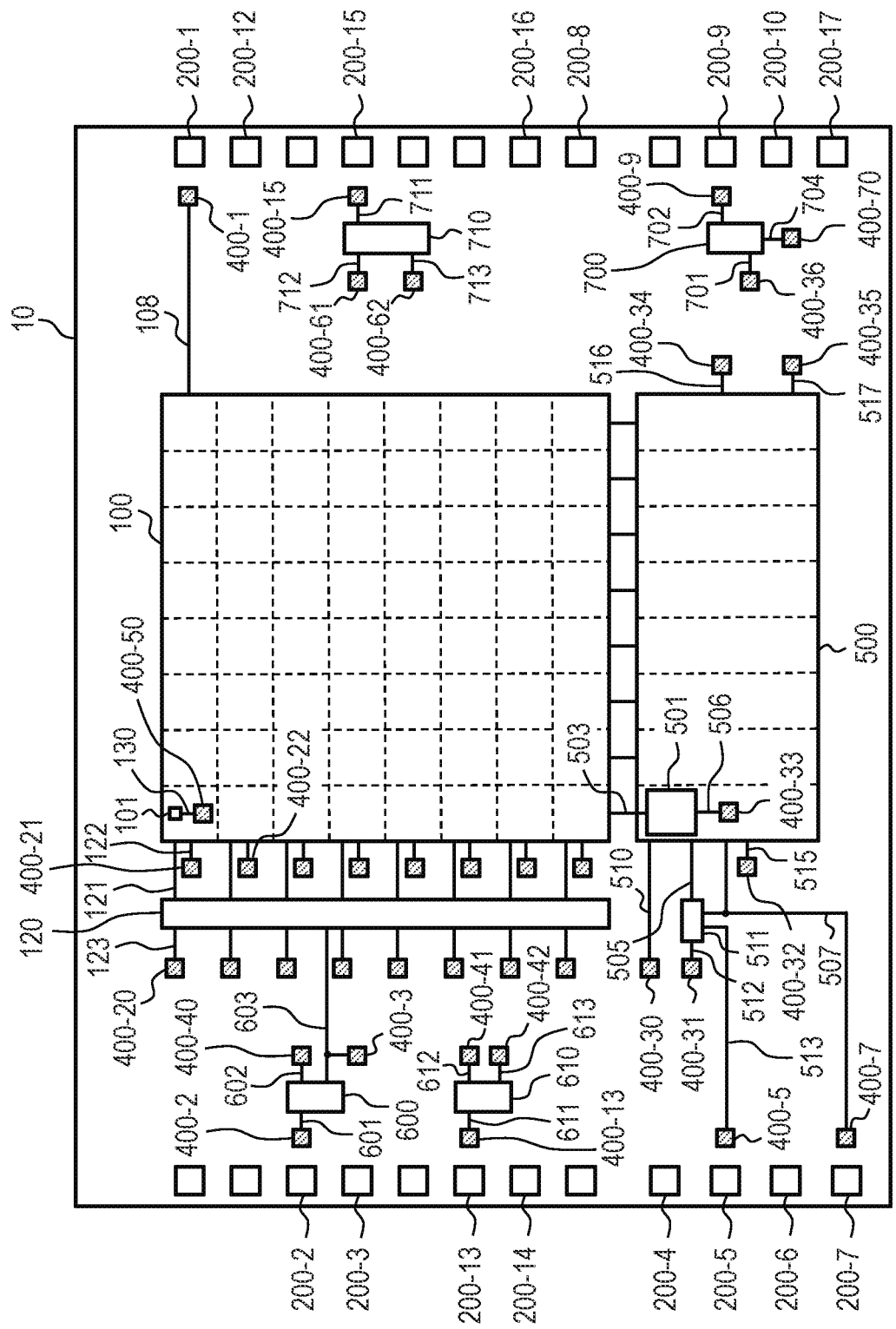
FIG. 16 and FIG. 17 are schematic plan views illustrating a schematic configuration of an imaging device according to a fourth embodiment of the present invention.
Figure 17:
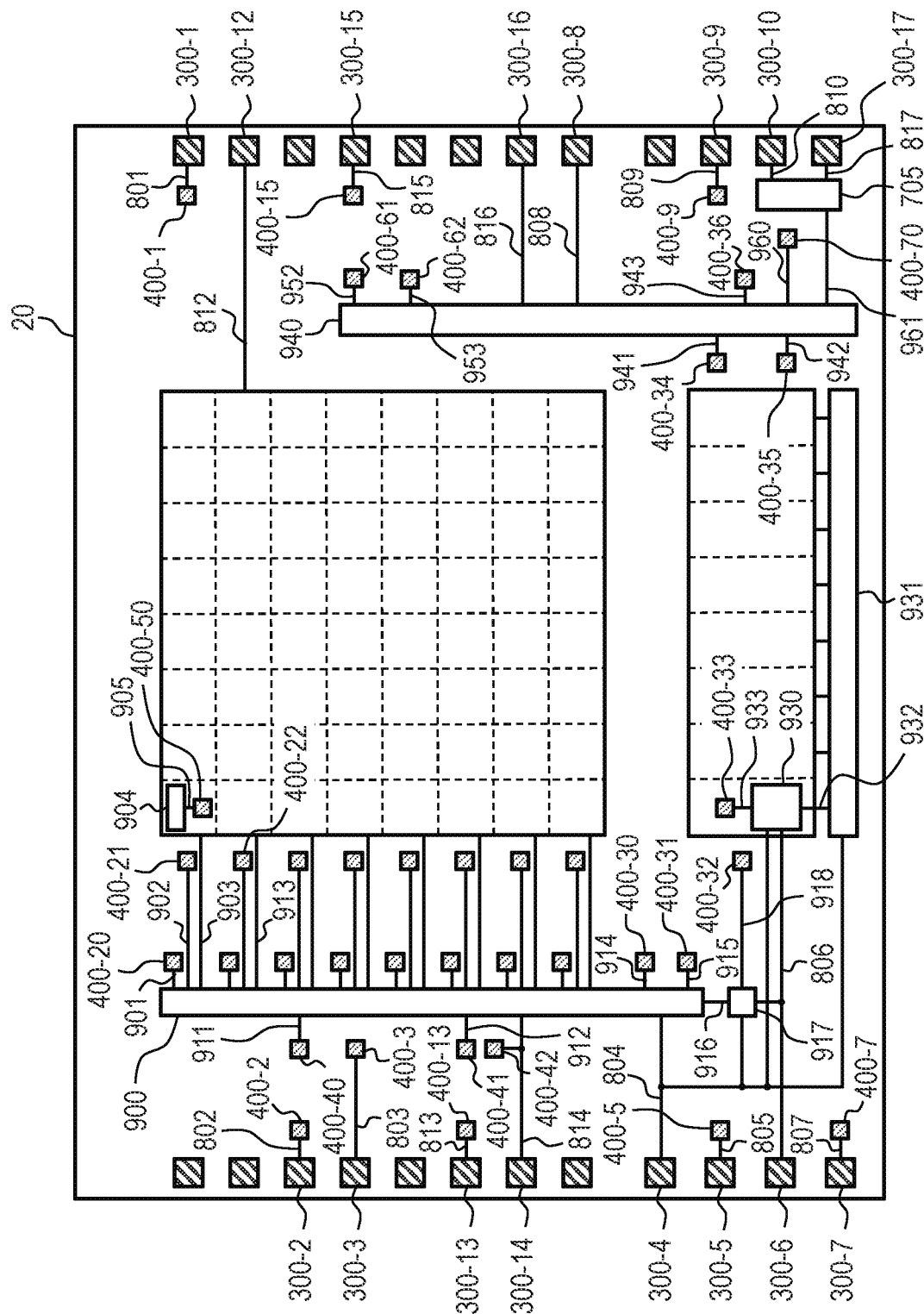
Figure 18:
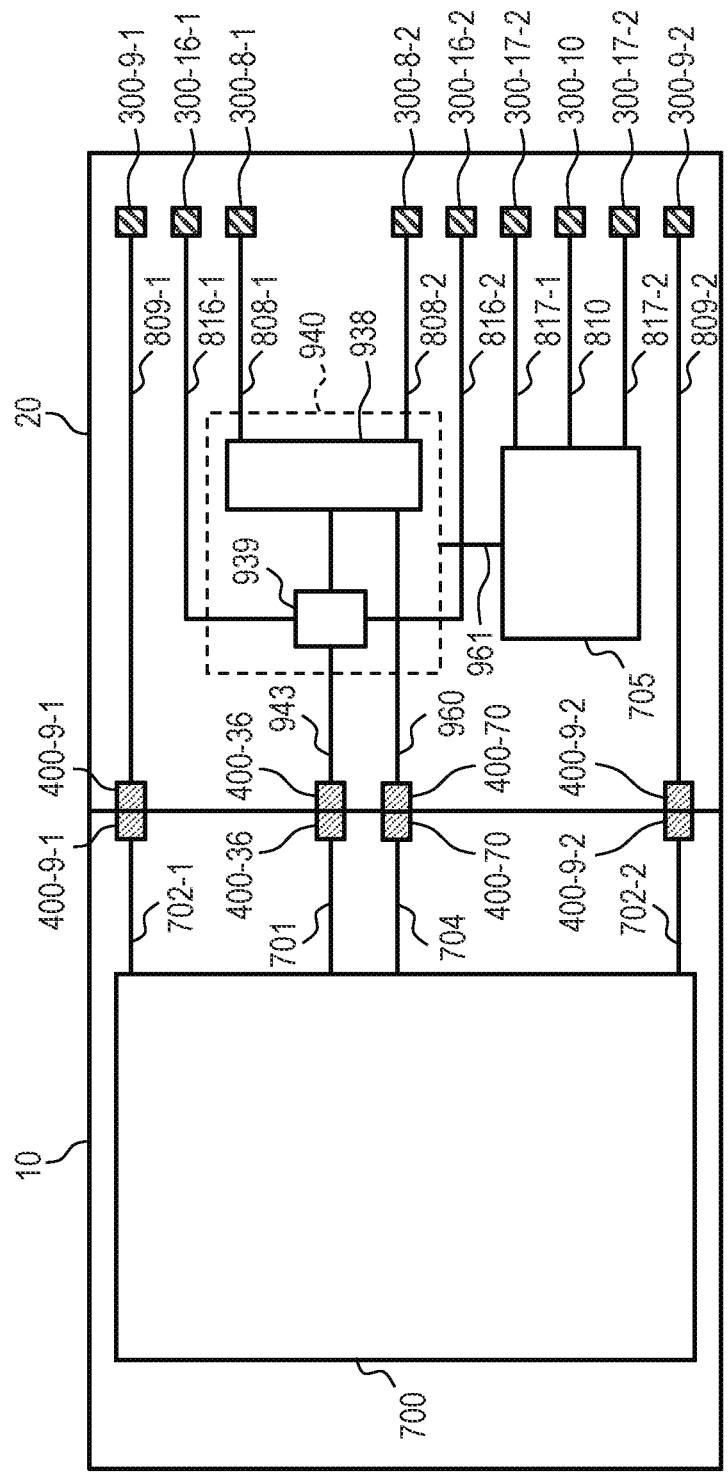
FIG. 18 is a schematic diagram illustrating a configuration example of a connecting portion in an imaging device according to a fourth embodiment of the present invention.

An imaging device according to a fourth embodiment of the present invention will be described with reference to FIG. 16 to FIG. 18. Components similar to those of the imaging device according to the first to third embodiments are denoted by the same reference numerals, and description thereof will be omitted or simplified. FIG. 16 and FIG. 17 are schematic plan views illustrating a schematic configuration of the imaging device according to the present embodiment. FIG. 18 is a circuit diagram illustrating a connection relationship between an output unit and a digital signal processing unit in the imaging device according to the present embodiment.

In the imaging device according to the present embodiment, some of the circuits of the output unit 700 described in the first to third embodiments are arranged on the second substrate 20. That is, the imaging device according to the present embodiment includes the output unit 700 provided on the first substrate 10 and an output unit 705 provided on the second substrate 20. The imaging device according to the present embodiment has the same configuration as that of the imaging device according to the third embodiment except for the portions relating to the output units 700 and 705, and therefore, the following description focuses on differences from the imaging device according to the third embodiment.

The functions of the output unit 700 described in the first to third embodiments include, for example, a P/S conversion function and a function of outputting a signal to the outside of the imaging device. In the present embodiment, the output unit 700 disposed on the first substrate 10 is a circuit having a P/S conversion function, and the output unit 705 disposed on the second substrate 20 is a circuit having a function of outputting a pixel signal to the outside of the imaging device.

The pixel signals on which the A/D conversion is performed in the signal processing unit 500 are held in a digital memory composed of a plurality of bits. The digital data held in the digital memory of the signal processing unit 500 is input to the digital signal processing unit 940 as parallel data via the output line 517, the connecting portion 400-35, and the interconnection 942. The digital signal processing unit 940 performs various digital signal processing on the inputted parallel data. The parallel data processed by the digital signal processing unit 940 is input to the output unit 700 via the interconnection 943, the connecting portion 400-36, and the signal input line 701. Although each of the interconnections and the connecting portions is illustrated as a single element in the drawings, the interconnections and the connecting portions are actually formed of a plurality of interconnections and connecting portions in order to transmit a plurality of data in parallel. A part of the signal input line 701 includes a signal for controlling the operation mode of the P/S conversion of the output unit 700, for example, the number of bits of data to be converted.

The output unit 700 converts digital data inputted in parallel into serial data. The pixel signal converted into serial data by the output unit 700 is input to the digital signal processing unit 940 via an interconnection 704, a connecting portion 400-70, and an interconnection 960. The digital signal processing unit 940 holds the input serial data and performs digital signal processing such as conversion of the number of bits, addition of data, and the like. The serial data processed by the digital signal processing unit 940 is input to the output unit 705 via an interconnection 961, and is output to the outside of the imaging device via the interconnection 810 and the pad electrode 300-10.

FIG. 18 is a diagram more specifically illustrating connections of the output unit 700, the digital signal processing unit 940 and the output unit 705 and connection relationships of power supply lines among connections via the connecting portion 400 in FIG. 16 and FIG. 17.

A power supply voltage is supplied from a pad electrode 300-8-1 via a power supply line 808-1, and a reference voltage GND is supplied from a pad electrode 300-8-2 via a power supply line 808-2 to the operation unit 938 of the digital signal processing unit 940. A power supply voltage is supplied from a pad electrode 300-16-1 to the driving unit 939 of the digital signal processing unit 940 via a power supply line 816-1, and a reference voltage GND is supplied from a pad electrode 300-16-2 via a power supply line 816-2. A power supply voltage is supplied from a pad electrode 300-9-1 to the output unit 700 via a power supply line 809-1, a connecting portion 400-9-1, and a power supply line 702-1. The reference voltage GND is supplied from a pad electrode 300-9-2 to the output unit 700 via a power supply line 809-2, a connecting portion 400-9-2, and a power supply line 702-2. A power supply voltage is supplied from a pad electrode 300-17-1 via a power supply line 817-1, and a reference voltage GND is supplied from a pad electrode 300-17-2 via a power supply line 817-2 to the output unit 705.

The pixel signal subjected to the digital processing by the operation unit 938 is input as parallel data from the driving unit 939 to the output unit 700 via the interconnection 943, the connecting portion 400-36, and the signal input line 701. As described above, the signal input line 701 includes a control signal line as a part of the signal input line 701. The output unit 700 generates serial data based on the inputted parallel data, and outputs the serial data to the operation unit 938 via the interconnection 704, the connecting portion 400-70, and the interconnection 960. The digital signal processing unit 940 outputs the serial data subjected to the digital signal processing to the output unit 705 via the interconnection 961. The output unit 705 generates, for example, a differential signal based on the input serial data, and outputs an LVDS output signal to the outside of the imaging device via the interconnection 810 and the pad electrode 300-10.

An example of the P/S conversion operation in the output unit 700 is an operation of converting parallel data into serial data at a frequency obtained by multiplying a frequency corresponding to a period in which parallel data is input from the digital signal processing unit 940 by the number of bits of pixel data. For example, when parallel 14-bit data is input from the digital signal processing unit 940 at a period of 1/50 MHz, the output unit 700 performs the P/S conversion operation at a frequency of 50 MHz×14 bits, i.e., 700 MHz. In the P/S conversion operation, for example, if there is a 1-bit conversion error, the influence on the pixel data becomes large. For example, the conversion error may be observed as random noise, or the amount of light of the object may not be accurately represented by the conversion error. The P/S conversion operation operating at a high frequency is susceptible to power supply fluctuations and crosstalk in peripheral circuit operations. Therefore, in the present embodiment, the output unit 700 having the P/S conversion function is disposed on the first substrate 10. The P/S conversion operation requires a clock signal of high frequency with high frequency accuracy and low jitter. Thus, as described in the third embodiment, a clock generation unit (not illustrated) for generating a clock signal to be supplied to the output unit 700 may be disposed in the vicinity of the output unit 700 of the first substrate 10.

On the other hand, since the output unit 705 generates a differential signal based on serial data inputted at high speed from the output unit 700, a power supply variation accompanying the operation is large, which may affect other circuits arranged in the vicinity. Further, when a signal output to the outside of the imaging device is an LVDS output signal, the design of the signal transmission path becomes important. Therefore, the output unit 705 having an output function is preferably disposed in the vicinity of the pad electrode 300 of the second substrate 20.

As described above, in the present embodiment, the output unit 700 that converts parallel data digitally processed by the digital signal processing unit 940 into serial data is disposed on the first substrate 10. Thus, the P/S conversion operation may be performed at high speed and with high accuracy. In the present embodiment, the output unit 705 that generates differential signals from serial data and outputs signals to the outside of the imaging device via the pad electrode 300 is disposed on the second substrate 20. Thus, the influence on the circuit disposed on the first substrate 10 may be reduced. Further, by disposing the output unit 705 in the vicinity of the pad electrode, the transmission path design of the signal may be facilitated.

In other words, the imaging device according to the present embodiment includes the first substrate 10 provided with a first circuit unit, and the second substrate 20 provided with a second circuit unit connected to the first circuit unit and a third circuit unit connected to the second circuit unit. The second circuit unit is configured to supply a driving voltage to the first circuit unit, and at least a part of driving voltages of the second circuit unit is supplied to the second circuit unit from a side of the first substrate 10. In the present embodiment, the first circuit unit, the second circuit unit, and the third circuit unit correspond to the output unit 700, the driving unit 939, and the operation unit 938, respectively.

As described above, according to the present embodiment, in the semiconductor device formed by stacking a plurality of substrates, it is possible to suppress noise contamination due to crosstalk between the substrates and deterioration of operation accuracy.

Fifth Embodiment

Figure 19:
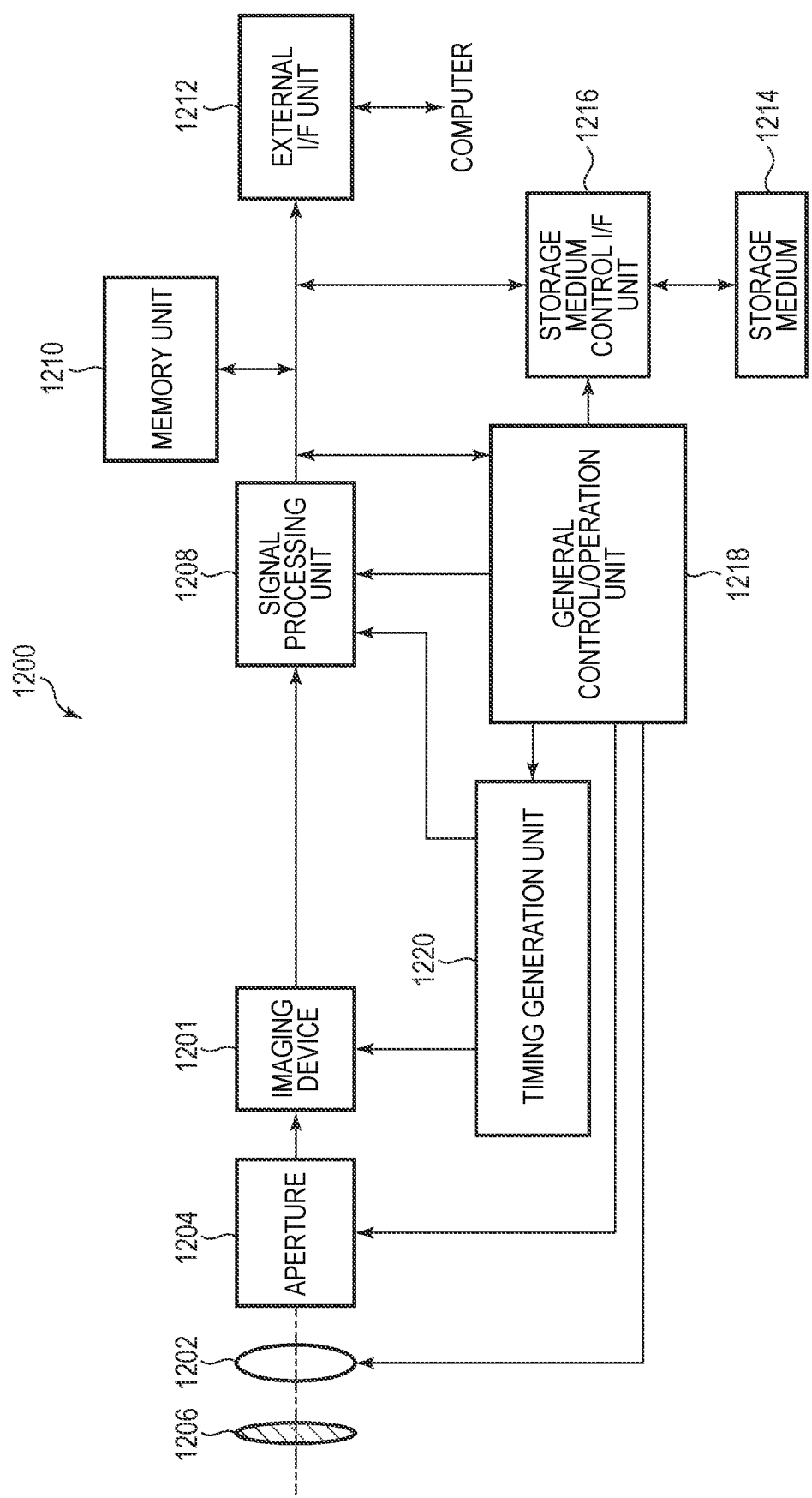
FIG. 19 is a block diagram illustrating a schematic configuration of an imaging system according to a fifth embodiment of the present invention.

An imaging system according to a fifth embodiment of the present invention will be described with reference to FIG. 19. FIG. 19 is a block diagram illustrating a schematic configuration of the imaging system according to the present embodiment.

The imaging device described in the first to fourth embodiments may be applied to various imaging systems. Examples of applicable imaging systems include digital still cameras, digital camcorders, surveillance cameras, copying machines, facsimiles, mobile phones, on-vehicle cameras, observation satellites, and the like. A camera module including an optical system such as a lens and an imaging device is also included in the imaging system. FIG. 19 is a block diagram of a digital still camera as an example of these.

The imaging system 1200 illustrated in FIG. 19 includes an imaging device 1201, a lens 1202 for forming an optical image of an object on the imaging device 1201, an aperture 1204 for varying the amount of light passing through the lens 1202, and a barrier 1206 for protecting the lens 1202. The lens 1202 and the aperture 1204 form an optical system that concentrate light on the imaging device 1201. The imaging device 1201 converts an optical image formed by the imaging device and the lens 1202 described in any of the first to fourth embodiments into image data.

The imaging system 1200 also includes a signal processing unit 1208 that processes an output signal output from the imaging device 1201. The signal processing unit 1208 generates image data from a digital signal output from the imaging device 1201. The signal processing unit 1208 performs various corrections and compressions as necessary and outputs the processed image data. The imaging device 1201 may include an A/D conversion unit that generates a digital signal to be processed by the signal processing unit 1208. The A/D conversion section may be formed in a semiconductor layer (semiconductor substrate) in which the photoelectric conversion section of the imaging device 1201 is formed, or may be formed in a semiconductor substrate different from the semiconductor layer in which the photoelectric conversion section of the imaging device 1201 is formed. The signal processing unit 1208 may be formed on the same semiconductor substrate as the imaging device 1201.

The imaging system 1200 further includes a memory unit 1210 for temporarily storing image data, and an external interface unit (external I/F unit) 1212 for communicating with an external computer or the like. Further, the imaging system 1200 includes a storage medium 1214 such as a semiconductor memory for storing or reading out the imaging data, and a storage medium control interface unit (storage medium control I/F unit) 1216 for storing or reading out the imaging data on or from the storage medium 1214. The storage medium 1214 may be built in the imaging system 1200 or may be detachable.

The imaging system 1200 further includes a general control/operation unit 1218 that controls various calculations and operations of the entire digital still camera, and a timing generation unit 1220 that outputs various timing signals to the imaging device 1201 and the signal processing unit 1208. Here, the timing signal or the like may be input from the outside, and the imaging system 1200 may include at least the imaging device 1201 and the signal processing unit 1208 that processes an output signal output from the imaging device 1201.

The imaging device 1201 outputs the imaging signal to the signal processing unit 1208. The signal processing unit 1208 performs predetermined signal processing on the imaging signal output from the imaging device 1201, and outputs image data. The signal processing unit 1208 generates an image using the imaging signal.

As described above, according to the present embodiment, an imaging system to which the imaging device according to the first to fourth embodiments is applied may be realized.

Sixth Embodiment

Figure 20A:
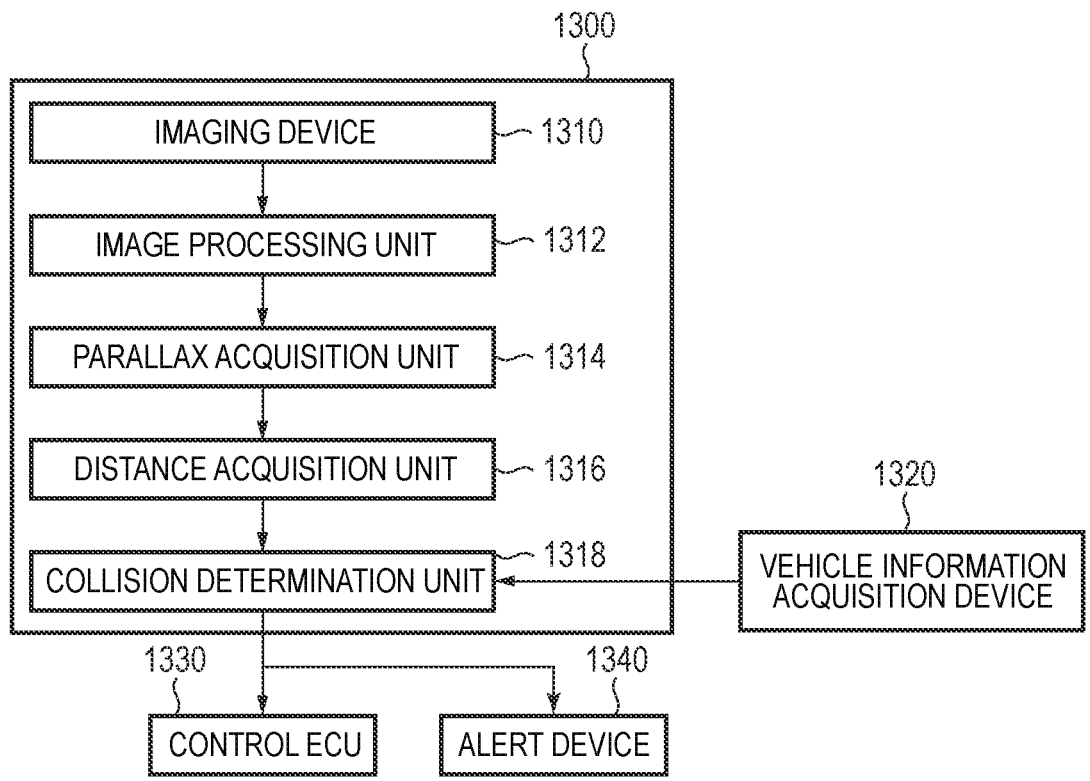
FIG. 20A is a diagram illustrating a configuration example of an imaging system according to a sixth embodiment of the present invention.
Figure 20B:
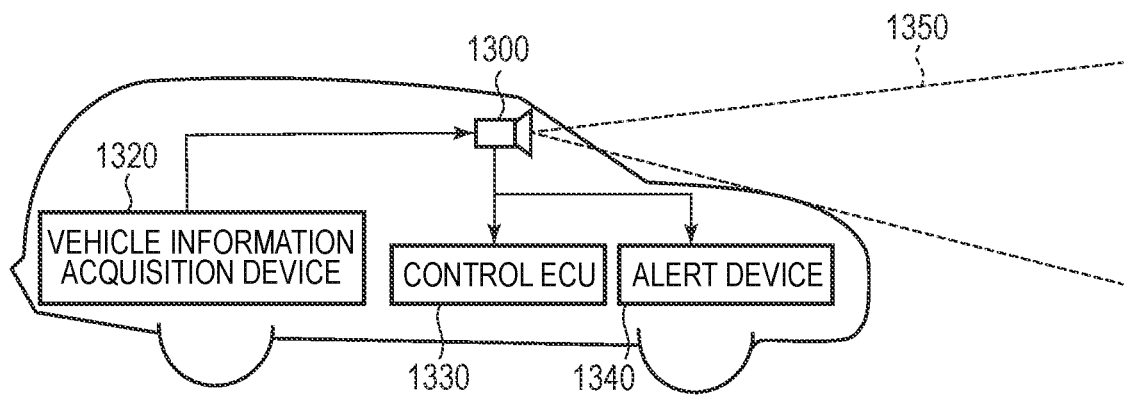
FIG. 20B is a diagram illustrating a configuration example of a movable object according to a sixth embodiment of the present invention.

An imaging system and a movable object according to a sixth embodiment of the present invention will be described with reference to FIG. 20A and FIG. 20B. FIG. 20A is a diagram illustrating a configuration of the imaging system according to the present embodiment. FIG. 20B is a diagram illustrating a configuration of the movable object according to the present embodiment.

FIG. 20A illustrates an example of an imaging system relating to an on-vehicle camera. The imaging system 1300 includes an imaging device 1310. The imaging device 1310 is the imaging device described in any one of the first to fourth embodiments. The imaging system 1300 includes an image processing unit 1312 that performs image processing on a plurality of image data acquired by the imaging device 1310, and a parallax acquisition unit 1314 that calculates parallax (phase difference of parallax images) from the plurality of image data acquired by the imaging device 1310. The imaging system 1300 includes a distance acquisition unit 1316 that calculates a distance to an object based on the calculated parallax, and a collision determination unit 1318 that determines whether or not there is a possibility of collision based on the calculated distance. Here, the parallax acquisition unit 1314 and the distance acquisition unit 1316 are examples of a distance information acquisition unit that acquires distance information to the object. That is, the distance information may be information on a parallax, a defocus amount, a distance to the object, and the like. The collision determination unit 1318 may determine the collision possibility using any of these pieces of distance information. The distance information acquisition unit may be implemented by dedicated hardware or software modules. Further, it may be implemented by FPGA (Field Programmable Gate Array), ASIC (Application Specific Integrated circuit), or the like, or may be implemented by a combination of these.

The imaging system 1300 is connected to a vehicle information acquisition device 1320, and may acquire vehicle information such as a vehicle speed, a yaw rate, and a steering angle. Further, the imaging system 1300 is connected to a control ECU 1330, which is a control device that outputs a control signal for generating a braking force to the vehicle, based on the determination result of the collision determination unit 1318. The imaging system 1300 is also connected to an alert device 1340 that issues an alert to the driver based on the determination result of the collision determination unit 1318. For example, when the collision possibility is high as the determination result of the collision determination unit 1318, the control ECU 1330 performs vehicle control to avoid collision and reduce damage by braking, returning an accelerator, suppressing engine output, or the like. The alert device 1340 alerts a user by sounding an alarm such as a sound, displaying alert information on a screen of a car navigation system or the like, or giving vibration to a seat belt or a steering wheel.

In the present embodiment, the imaging system 1300 images the periphery of the vehicle, for example, the front or the rear. FIG. 20B illustrates an imaging system in the case of imaging an image in front of a vehicle (an imaging range 1350). The vehicle information acquisition device 1320 sends an instruction to the imaging system 1300 or the imaging device 1310. With such a configuration, the accuracy of distance measurement may be further improved.

In the above description, an example has been described in which control is performed so as not to collide with other vehicles, but the present invention is also applicable to control of automatic driving following other vehicles, control of automatic driving so as not to go out of a lane, and the like. Further, the imaging system is not limited to a vehicle such as a host vehicle, and may be applied to, for example, a movable object (moving device) such as a ship, an aircraft, or an industrial robot. In addition, the present invention may be applied not only to a movable object but also to a wide variety of equipment such as an intelligent transport system (ITS).

Seventh Embodiment

Figure 21:
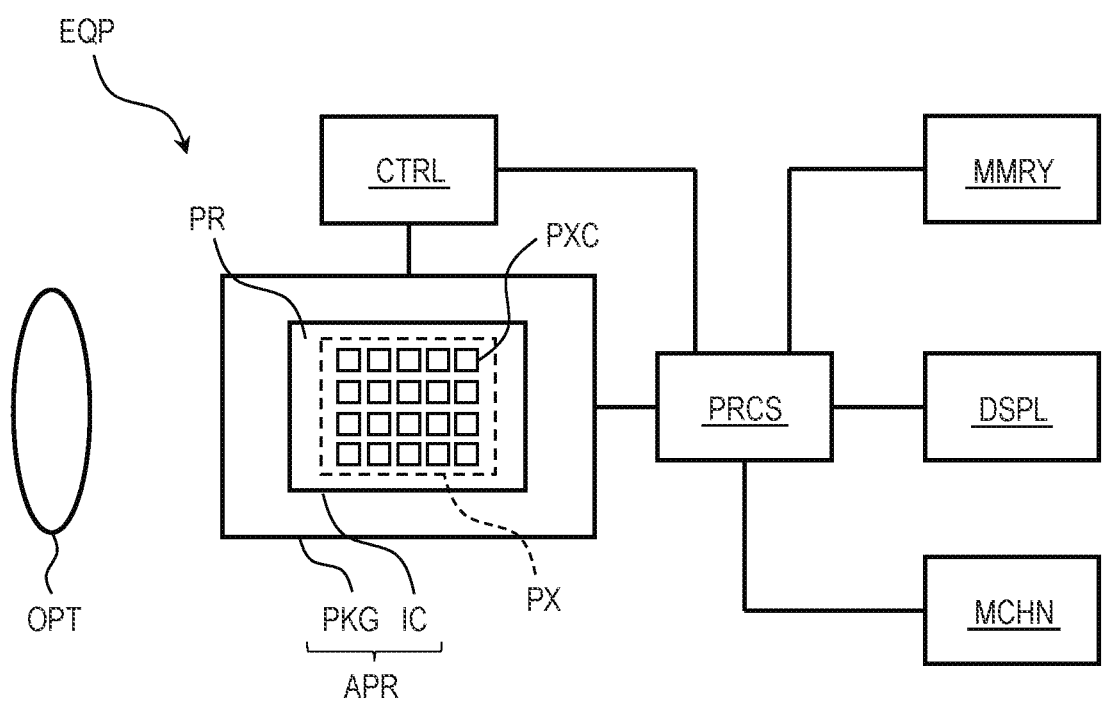
FIG. 21 is a block diagram illustrating a schematic configuration of equipment according to a seventh embodiment of the present invention.

Equipment according to a seventh embodiment of the present invention will be described with reference to FIG. 21. FIG. 21 is a block diagram illustrating a schematic configuration of equipment according to the present embodiment.

FIG. 21 is a schematic diagram illustrating equipment EQP including the photoelectric conversion device APR. The photoelectric conversion device APR has the function of the imaging device according to any one of the first to fourth embodiments. All or a part of the photoelectric conversion device APR is a semiconductor device IC. The photoelectric conversion device APR of this example may be used, for example, as an image sensor, an AF (Auto Focus) sensor, a photometry sensor, or a distance measurement sensor. The semiconductor device IC includes a pixel area PX in which pixel circuits PXC including photoelectric conversion units are arranged in a matrix. The semiconductor device IC may include a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric conversion units and a second semiconductor chip provided with peripheral circuits are stacked. Each peripheral circuit in the second semiconductor chip may be a column circuit corresponding to a pixel column of the first semiconductor chip. The peripheral circuits in the second semiconductor chip may be matrix circuits corresponding to the pixels or the pixel blocks of the first semiconductor chip. As a connection between the first semiconductor chip and the second semiconductor chip, a through electrode (TSV), an inter-chip interconnection by direct bonding of a conductor such as copper, a connection by micro bumps between chips, a connection by wire bonding, or the like may be adopted.

In addition to the semiconductor device IC, the photoelectric conversion device APR may include a package PKG that accommodates the semiconductor device IC. The package PKG may include a base body to which the semiconductor device IC is fixed, a lid body made of glass or the like facing the semiconductor device IC, and a connection member such as a bonding wire or a bump that connects terminals provided on the base body to terminals provided on the semiconductor device IC.

The equipment EQP may further comprise at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an AFE (analog front end) or a DFE (digital front end). The processing unit PRCS is a semiconductor device such as a central processing unit (CPU) or an ASIC. The display device DSPL may be an EL display device or a liquid crystal display device which displays information (image) obtained by the photoelectric conversion device APR. The storage device MMRY may be a magnetic device or a semiconductor device that stores information (image) obtained by the photoelectric conversion device APR. The storage device MMRY may be a volatile memory such as an SRAM or a DRAM, or a nonvolatile memory such as a flash memory or a hard disk drive. The mechanical device MCHN includes a movable portion or a propulsion portion such as a motor or an engine. In the equipment EQP, a signal output from the photoelectric conversion device APR may be displayed on the display device DSPL, and is transmitted to the outside by a communication device (not illustrated) included in the equipment EQP. Therefore, it is preferable that the equipment EQP further include a storage device MMRY and a processing device PRCS separately from the storage circuit unit and the arithmetic circuit unit included in the photoelectric conversion device APR.

The equipment EQP illustrated in FIG. 21 may be an electronic device such as an information terminal (for example, a smartphone or a wearable terminal) having a photographing function or a camera (for example, an interchangeable lens camera, a compact camera, a video camera, and a surveillance camera.). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating operation (manipulation) may perform processing for operating the mechanical device MCHN as a mobile device based on information obtained by the photoelectric conversion device APR The photoelectric conversion device APR according to the present embodiment may provide the designer, the manufacturer, the seller, the purchaser, and/or the user with high value. Therefore, when the photoelectric conversion device APR is mounted on the equipment EQP, the value of the equipment EQP may be increased. Therefore, in order to increase the value of the equipment EQP, it is advantageous to determine the mounting of the photoelectric conversion device APR of the present embodiment on the equipment EQP when the equipment EQP is manufactured and sold.

Modified Embodiments

The present invention is not limited to the above-described embodiments, and various modifications are possible. For example, an example in which some of the configurations of any of the embodiments are added to other embodiments or examples in which some of the configurations of any of the embodiments are substituted with some of the configurations of the other embodiments is also an embodiment of the present invention.

Further, in the second to fourth embodiments, the additional configuration of the imaging device according to the first embodiment has been described, but the additional configuration described in each of the second to fourth embodiments may be applied to the imaging device according to the reference example described with reference to FIG. 2 to FIG. 6.

The circuit configuration of the pixel 101 illustrated in FIG. 4 is an example, and may be changed as appropriate. For example, each pixel 101 may include two or more photoelectric conversion elements 102. Further, a plurality of photoelectric conversion elements 102 of one pixel 101 may constitute a pupil division pixel sharing one microlens. The pixel 101 does not necessarily include the select transistor 106. The capacitance value of the floating diffusion FD may be switchable.

The circuit configuration of the amplifier 501 illustrated in FIG. 5 is an example, and may be appropriately changed. For example, in the configuration example of FIG. 5, two feedback capacitors C1 and C2 are connected in parallel to the amplifier circuit 502, but the number of feedback capacitors is not limited thereto. Although the input capacitor C0 is provided in the configuration example of FIG. 5, the capacitance value of the input capacitor may be switchable. The circuit configuration of the amplifier 501 may be appropriately changed according to the type of necessary voltage amplification factor and the like.

The imaging systems illustrated in the fifth and sixth embodiments are examples of imaging systems to which the semiconductor device of the present invention may be applied, and imaging systems to which the semiconductor device of the present invention may be applied are not limited to the configurations illustrated in FIG. 19 and FIG. 20A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-167252, filed Oct. 12, 2021 which is hereby incorporated by reference herein in its entirety.

What is claimed is:

1. A semiconductor device comprising:
a first substrate provided with a first circuit unit; and
a second substrate provided with a second circuit unit connected to the first circuit unit and a third circuit unit connected to the second circuit unit;
a first power supply line for supplying a power supply voltage and a reference voltage to the second circuit unit; and
a second power supply line for supplying a power supply voltage and a reference voltage to the third circuit unit,
wherein the second circuit unit supplies a driving voltage to the first circuit unit,
wherein at least a part of driving voltages of the second circuit unit is supplied from the first substrate to the second circuit unit, and
wherein the first power supply line and the second power supply line are separately provided.

2. The semiconductor device according to claim 1, wherein the driving voltage supplied from the first substrate to the second circuit unit is supplied to the second circuit unit via a connecting portion between the first substrate and the second substrate.

3. The semiconductor device according to claim 2, wherein the first circuit unit and the second circuit unit are connected via a plurality of connecting portions in parallel to the connecting portion supplying the driving voltage to the second circuit unit.

4. The semiconductor device according to claim 1, wherein the second circuit unit is a level shift circuit configured to shift a level of a signal input from the third circuit unit to a level in accordance with the first circuit unit, and
wherein the driving voltage supplied from the first substrate to the second circuit unit is a power supply voltage or a reference voltage for driving the second circuit unit.

5. The semiconductor device according to claim 4, wherein the first circuit unit is an amplifier, and
wherein the third circuit unit generates a control signal for controlling a gain of the amplifier.

6. The semiconductor device according to claim 4, wherein the first circuit unit includes a pixel including a photoelectric conversion element, and
wherein the third circuit unit generates a control signal for controlling the pixel.

7. The semiconductor device according to claim 4, wherein the power supply voltage or the reference voltage is supplied from the second substrate to the second circuit unit via the first substrate.

8. The semiconductor device according to claim 4 further comprising a voltage generation unit provided on the first substrate,
wherein the voltage generation unit generates the power supply voltage or the reference voltage supplied to the second circuit unit.

9. The semiconductor device according to claim 1, wherein the first circuit unit is a clock generation unit configured to generate a clock signal,
wherein the second circuit unit is a driving unit configured to control a frequency of the clock signal, and
wherein the third circuit unit is a signal processing unit configured to perform a signal processing based on the clock signal.

10. The semiconductor device according to claim 1, wherein the first circuit unit is a parallel-serial conversion unit configured to convert parallel data supplied from the second circuit unit into serial data, and
wherein the third circuit unit is an output unit configured to output the serial data received from the first circuit unit via the second circuit unit to an outside.

11. The semiconductor device according to claim 1, wherein pad electrodes to which the power supply voltage and the reference voltage of the second circuit unit are supplied and pad electrodes to which the power supply voltage and the reference voltage of the third circuit unit are supplied are separately provided.

12. The semiconductor device according to claim 11, wherein the pad electrodes are provided on the second substrate.

13. The semiconductor device according to claim 1, wherein the first power supply line includes a first interconnection to which the power supply voltage is supplied and a second interconnection to which the reference voltage is supplied, and
wherein the semiconductor device further includes a capacitor provided on the first substrate and connected between the first interconnection and the second interconnection.

14. Equipment comprising:
the semiconductor device according to claim 1, and
at least one of an optical device corresponding to the semiconductor device,
a control device configured to control the semiconductor device,
a processing device configured to process a signal output from the semiconductor device,
a mechanical device that is controlled based on information obtained by the semiconductor device,
a display device configured to display information obtained by the semiconductor device, and
a storage device configured to store information obtained by the semiconductor device.

15. A semiconductor device comprising:
a first substrate on which a pixel configured to output a pixel signal based on a charge generated in a photoelectric conversion element and an amplifier configured to amplify the pixel signal are disposed; and
a second substrate on which a first operation unit configured to generate a control signal for controlling a gain of the amplifier and a first driving unit configured to shift a level of the control signal to a level in accordance with a driving voltage of the amplifier to drive the amplifier are disposed,
wherein the control signal is input from the first driving unit to the amplifier via a connecting portion between the first substrate and the second substrate, and
wherein at least one of a power supply voltage and a reference voltage for driving the first driving unit is supplied from the first substrate to the first driving unit via a connecting portion between the first substrate and the second substrate.

16. The semiconductor device according to claim 15 further comprising a second operation unit configured to generate a control signal for controlling the pixel, and a second driving unit configured to drive the pixel by shifting a level of the control signal to a level in accordance with a driving voltage of the pixel,
wherein the second operation unit and the second driving unit are disposed on the second substrate,
wherein the control signal is input to the pixel from the second driving unit via a connecting portion between the first substrate and the second substrate, and
wherein at least one of a power supply voltage and a reference voltage for driving the second driving unit is supplied from the first substrate to the second driving unit via a connecting portion between the first substrate and the second substrate.

17. The semiconductor device according to claim 15 further comprising a clock generation unit configured to generate a clock signal, a third driving unit configured to control a frequency of the clock signal, and a third operation unit configured to perform a signal processing on the pixel signal based on the clock signal,
wherein the clock generation unit is disposed on the first substrate,
wherein the third driving unit and the third operation unit are disposed on the second substrate,
wherein the third driving unit drives the clock generation unit via a connecting portion between the first substrate and the second substrate, and
wherein the clock signal is supplied to the third operation unit via a connecting portion between the first substrate and the second substrate.

18. The semiconductor device according to claim 15 further comprising a signal processing unit configured to perform analog/digital conversion on the pixel signal and holds the converter pixel signal as parallel data of a plurality of bits, a digital signal processing unit configured to perform a digital signal processing on the parallel data, a parallel-serial conversion unit configured to convert the parallel data processed by the digital signal processing unit into serial data, a fourth driving unit configured to control the parallel-serial conversion unit, and an output unit configured to output the serial data to an outside,
wherein the signal processing unit and the parallel-to-serial converter are disposed on the first substrate,
wherein the digital signal processing unit, the fourth driving unit, and the output unit are disposed on the second substrate,
wherein the parallel data is input from the signal processing unit to the digital signal processing unit via a connecting portion between the first substrate and the second substrate,
wherein the parallel data processed by the digital signal processing unit is input from the digital signal processing unit to the parallel-serial conversion unit via a connection portion between the first substrate and the second substrate, and
wherein the serial data is input from the parallel-serial converter to the output unit via a connecting portion between the first substrate and the second substrate.

19. An imaging system comprising:
the semiconductor device according to claim 15; and
a signal processing device configured to process a signal output from the semiconductor device.

20. A movable object comprising:
the semiconductor device according to claim 15; and
a distance information acquisition unit configured to acquire distance information to an object from a parallax image based on a signal from the semiconductor device; and
a control unit configured to control the movable object based on the distance information.

21. Equipment comprising:
the semiconductor device according to claim 15, and
at least one of
an optical device corresponding to the semiconductor device,
a control device configured to control the semiconductor device,
a processing device configured to process a signal output from the semiconductor device,
a mechanical device that is controlled based on information obtained by the semiconductor device,
a display device configured to display information obtained by the semiconductor device, and
a storage device configured to store information obtained by the semiconductor device.

* * * * *

UNITED STATES PATENT AND TRADEMARK OFFICE
CERTIFICATE OF CORRECTION

| | | |
|---|---|---|
| PATENT NO. | : 12,483,812 B2 | Page 1 of 1 |
| APPLICATION NO. | : 17/959477 | |
| DATED | : November 25, 2025 | |
| INVENTOR(S) | : Daisuke Kobayashi | |

It is certified that error appears in the above-identified patent and that said Letters Patent is hereby corrected as shown below:

On the Title Page

Item (54) and in the Specification Column 1, Line 1, In the Title, change "SEMICONDUCTOR DEVICE" to --SEMICONDUCTOR DEVICE HAVING SEPARATELY PROVIDED POWER SUPPLY LINES FOR TWO CIRCUITS ON A SUBSTRATE--.

Signed and Sealed this
Thirteenth Day of January, 2026

John A. Squires
*Director of the United States Patent and Trademark Office*